United States Patent
Kim et al.

(10) Patent No.: US 10,849,070 B2
(45) Date of Patent: Nov. 24, 2020

(54) METHOD FOR TRANSMITTING OR RECEIVING WAKE-UP RADIO FRAME IN WIRELESS LAN SYSTEM AND APPARATUS THEREFOR

(71) Applicant: LG ELECTRONICS INC., Seoul (KR)

(72) Inventors: Jeongki Kim, Seoul (KR); Kiseon Ryu, Seoul (KR); Hyunhee Park, Seoul (KR); Suhwook Kim, Seoul (KR); Hangyu Cho, Seoul (KR); Jinyoung Chun, Seoul (KR); Jinsoo Choi, Seoul (KR); Taewon Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/467,025

(22) PCT Filed: Dec. 6, 2017

(86) PCT No.: PCT/KR2017/014220
§ 371 (c)(1),
(2) Date: Jun. 5, 2019

(87) PCT Pub. No.: WO2018/106006
PCT Pub. Date: Jun. 14, 2018

(65) Prior Publication Data
US 2019/0281551 A1  Sep. 12, 2019

Related U.S. Application Data

(60) Provisional application No. 62/430,917, filed on Dec. 6, 2016, provisional application No. 62/513,945, filed
(Continued)

(51) Int. Cl.
*H04W 52/02* (2009.01)
*H04W 28/06* (2009.01)
(Continued)

(52) U.S. Cl.
CPC ....... *H04W 52/0229* (2013.01); *H04W 28/06* (2013.01); *H04W 52/02* (2013.01);
(Continued)

(58) Field of Classification Search
CPC . H04W 52/0229; H04W 28/06; H04W 52/02; H04W 84/12; Y02D 70/12;
(Continued)

(56) References Cited

U.S. PATENT DOCUMENTS

2006/0153126 A1* 7/2006 Jung ............ H04W 28/06
370/328
2010/0112950 A1  5/2010 Haartsen et al.
(Continued)

OTHER PUBLICATIONS

PCT International Application No. PCT/KR2017/014220, Written Opinion of the International Searching Authority dated Mar. 15, 2018, 17 pages.

*Primary Examiner* — Thai Nguyen
(74) *Attorney, Agent, or Firm* — Lee Hong Degerman Kang Waimey

(57) ABSTRACT

A method for transmitting a wake-up radio (WUR) frame by an access point (AP) in a wireless LAN (WLAN) system according to one embodiment of the present invention comprises the steps of: generating a WUR frame including a WUR preamble and a MAC header; and transmitting the WUR frame, wherein the MAC header includes at least one of frame length information, a transmitter ID and a receiver ID, and when the frame length information is included in the MAC header, the frame length information indicates a length of MAC content located after the WUR preamble in
(Continued)

the WUR frame, but the length of the MAC header may be excluded from the indicated length of the MAC content.

10 Claims, 22 Drawing Sheets

Related U.S. Application Data on Jun. 1, 2017, provisional application No. 62/581,014, filed on Nov. 2, 2017, provisional application No. 62/588,410, filed on Nov. 19, 2017.

(51) Int. Cl.
*H04L 29/12* (2006.01)
*H04W 84/12* (2009.01)

(52) U.S. Cl.
CPC ......... *H04L 61/6022* (2013.01); *H04W 84/12* (2013.01); *Y02D 70/00* (2018.01); *Y02D 70/10* (2018.01); *Y02D 70/12* (2018.01); *Y02D 70/14* (2018.01)

(58) Field of Classification Search
CPC ........ Y02D 70/14; Y02D 70/10; Y02D 70/00; H04L 61/6022
See application file for complete search history.

(56) References Cited

U.S. PATENT DOCUMENTS

| | | |
|---|---|---|
| 2014/0194062 A1* | 7/2014 | Palin ..................... H04W 8/005 455/41.2 |
| 2014/0204822 A1* | 7/2014 | Park .................. H04W 52/0216 370/311 |
| 2014/0254445 A1 | 9/2014 | Heinzelman et al. |
| 2014/0269462 A1 | 9/2014 | Jia et al. |
| 2016/0278147 A1 | 9/2016 | Adrangi et al. |
| 2016/0337973 A1 | 11/2016 | Park et al. |
| 2016/0374018 A1* | 12/2016 | Min ..................... H04L 5/0053 |

* cited by examiner

FIG. 27
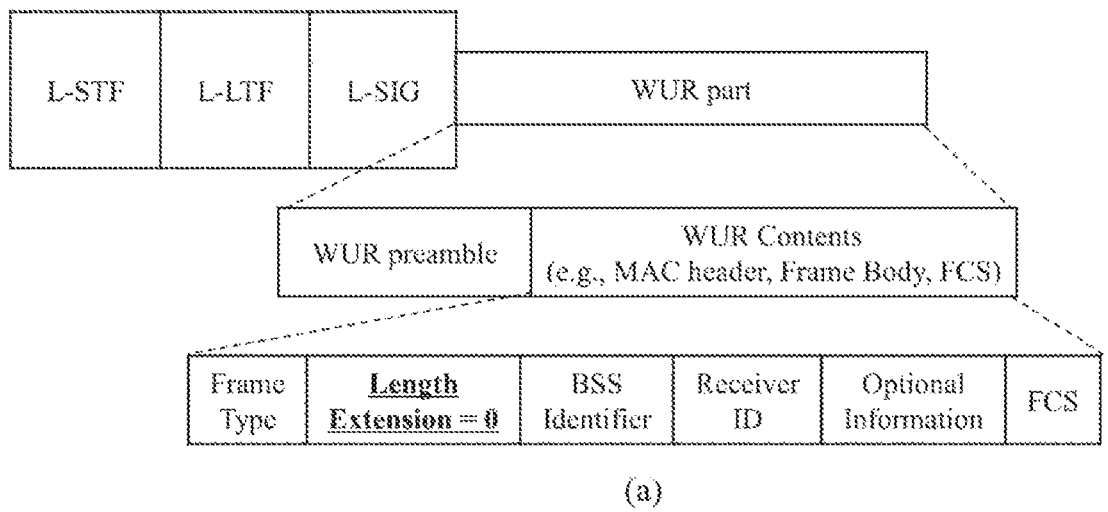
(a)
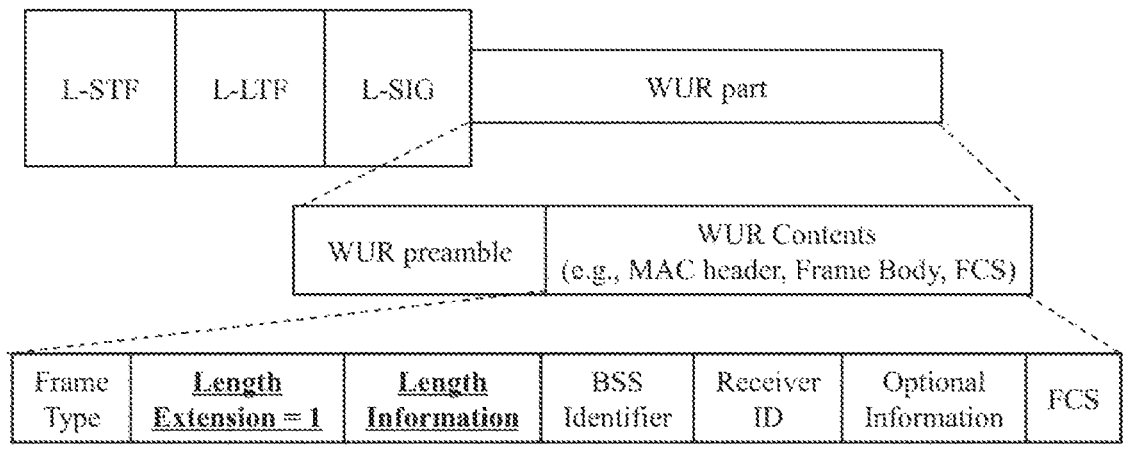
(b)

FIG. 28
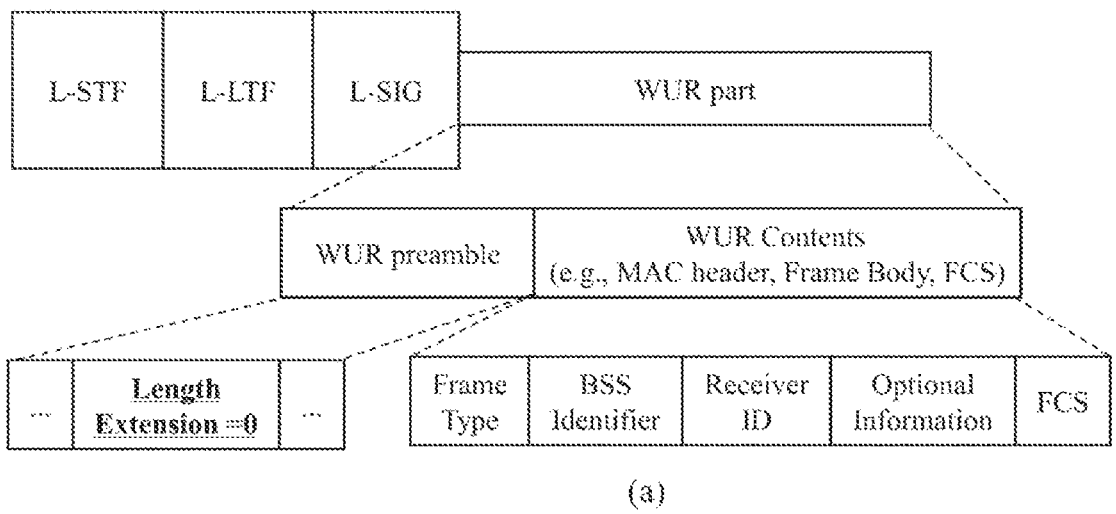
(a)
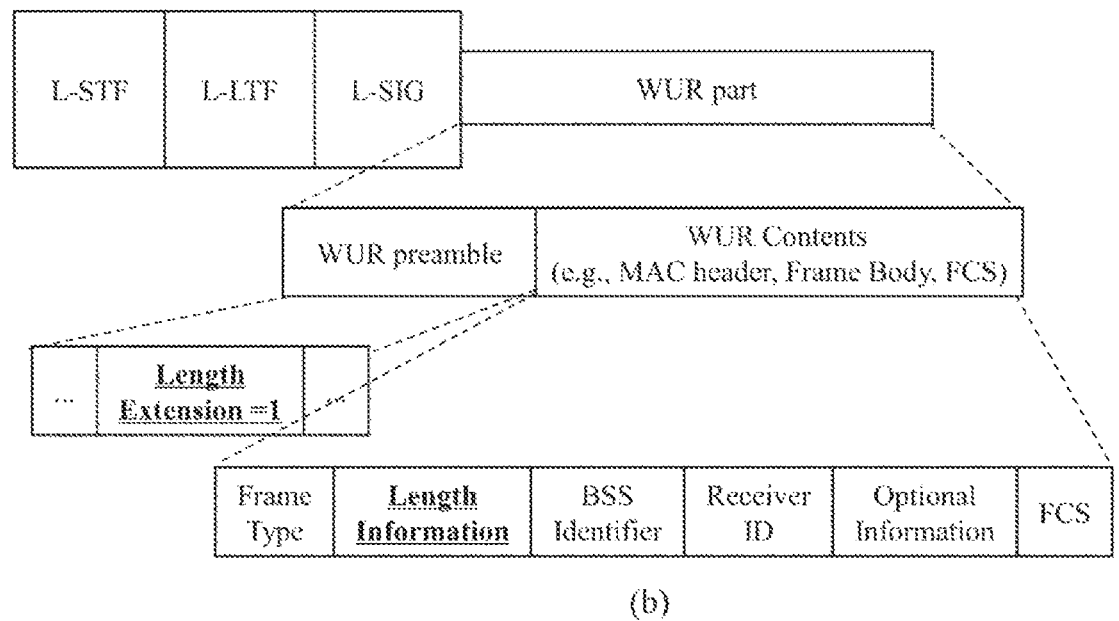
(b)

METHOD FOR TRANSMITTING OR RECEIVING WAKE-UP RADIO FRAME IN WIRELESS LAN SYSTEM AND APPARATUS THEREFOR

CROSS-REFERENCE TO RELATED APPLICATIONS

This application is the National Stage filing under 35 U.S.C. 371 of International Application No. PCT/KR2017/014220, filed on Dec. 6, 2017, which claims the benefit of U.S. Provisional Application No. 62/430,917, filed on Dec. 6, 2016, 62/513,945, filed on Jun. 1, 2017, 62/581,014, filed on Nov. 2, 2017, and 62/588,410, filed on Nov. 19, 2017, the contents of which are all hereby incorporated by reference herein in their entireties.

TECHNICAL FIELD

The present invention relates to a wireless local area network system and, more particularly, to a method of transmitting or receiving a Wake-Up Radio (WUR) frame through a WUR to wake a Primary Connectivity Radio (PCR) and an apparatus therefor.

BACKGROUND ART

Standards for Wireless Local Area Network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

DESCRIPTION OF THE INVENTION

Technical Problems

It is a technical object of the present invention to provide a method of more accurately and efficiently transmitting or receiving a WUR frame and an apparatus therefor.

The present invention is not limited to the above technical problems and other technical objects may be inferred from embodiments of the present invention.

Technical Solutions

According to an aspect of the present invention, provided herein is a method of transmitting a Wake-Up Radio (WUR) frame by an Access Point (AP) in a Wireless Local Area Network (WLAN) system, including generating a WUR frame including a WUR preamble and a Media Access Control (MAC) header; and transmitting the WUR frame, wherein the MAC header includes at least one of frame length information, a transmitter identifier (ID), and a receiver ID, and if the frame length information is included in the MAC header, the frame length information indicates the length of MAC content located after the WUR preamble in the WUR frame and the length of the MAC header is excluded from the indicated length of the MAC content.

According to another aspect of the present invention, provided herein is an Access Point (AP) for transmitting a Wake-Up Radio (WUR) frame in a Wireless Local Area Network (WLAN) system, including a processor configured to generate a WUR frame including a WUR preamble and a Media Access Control (MAC) header; and a transmitter configured to transmit the WUR frame, wherein the MAC header includes at least one of frame length information, a transmitter identifier (ID), and a receiver ID, and if the frame length information is included in the MAC header, the frame length information indicates the length of MAC content located after the WUR preamble in the WUR frame and the length of the MAC header is excluded from the indicated length of the MAC content.

According to another aspect of the present invention, provided herein is a method of receiving a Wake-Up Radio (WUR) frame by a station (STA) in a Wireless Local Area Network (WLAN) system, including receiving a WUR frame including a WUR preamble and a Media Access Control (MAC) header; and decoding the WUR frame, wherein the MAC header includes at least one of frame length information, a transmitter identifier (ID), and a receiver ID, and if the frame length information is included in the MAC header, the frame length information indicates the length of MAC content located after the WUR preamble in the WUR frame and the length of the MAC header is excluded from the indicated length of the MAC content.

According to another aspect of the present invention, provided herein is a station (STA) for receiving a Wake-Up Radio (WUR) frame in a Wireless Local Area Network (WLAN) system, including a receiver configured to receive a WUR frame including a WUR preamble and a Media Access Control (MAC) header; and a processor configured to decode the WUR frame, wherein the MAC header includes at least one of frame length information, a transmitter identifier (ID), and a receiver ID, and if the frame length information is included in the MAC header, the frame length information indicates the length of MAC content located after the WUR preamble in the WUR frame and the length of the MAC header is excluded from the indicated length of the MAC content.

The length of the MAC content indicated by the frame length information may include the length of a frame body of the WUR frame.

If the WUR frame corresponds to a predefined fixed length, the frame length information may be omitted from the MAC header. For example, only when the WUR frame corresponds to a variable length, the frame length information may be included in the MAC header. Whether the WUR frame corresponds to the predefined fixed length or the variable length may be indicated through the MAC header.

If the frame length information is included in the MAC header, the frame length information may indicate the length of the MAC content in units of predetermined bytes.

The WUR preamble may include a sequence for time synchronization for the WUR frame, the transmitter ID may correspond to the AP, and the receiver ID may correspond to at least one station (STA) for receiving the WUR frame.

Advantageous Effects

According to an embodiment of the present invention, a WUR frame may be more efficiently and accurately transmitted or received by directly/indirectly indicating a WUR frame length through a MAC header.

Other technical effects in addition to the above-described effects may be inferred from embodiments of the present invention.

DESCRIPTION OF DRAWINGS

FIG. 27 illustrates a WUR frame according to an embodiment of the present invention.

FIG. 28 illustrates a WUR frame according to another embodiment of the present invention.

BEST MODE FOR CARRYING OUT THE INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described before, the following description is given of a method and apparatus for increasing a spatial reuse rate in a Wireless Local Area Network (WLAN) system. To do so, a WLAN system to which the present invention is applied will first be described in detail.

Figure 1:
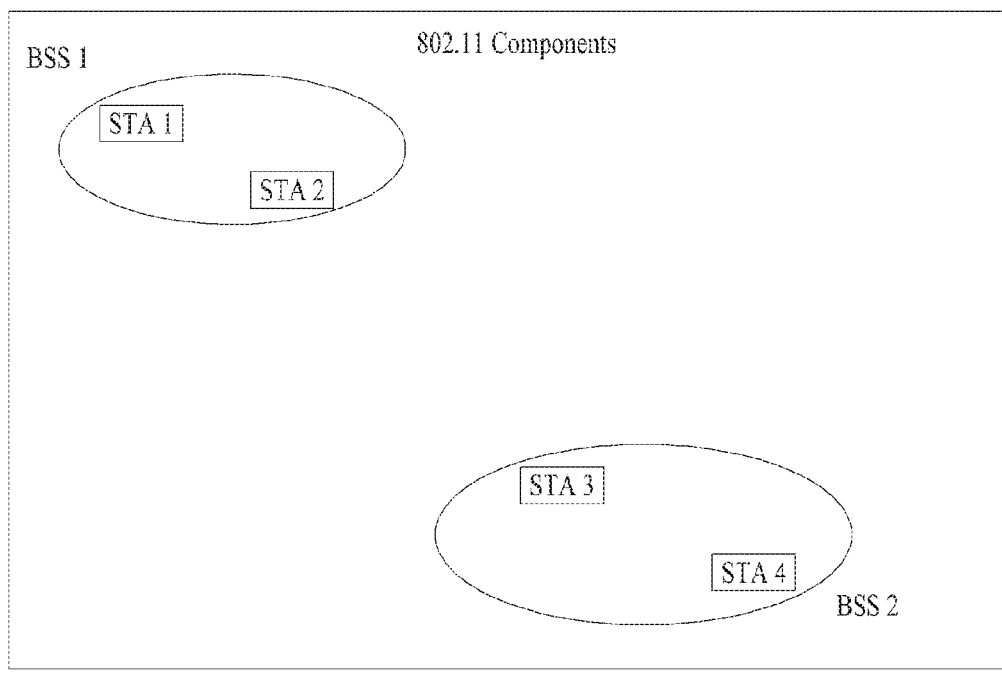
FIG. 1 illustrates an example of a configuration of a wireless LAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
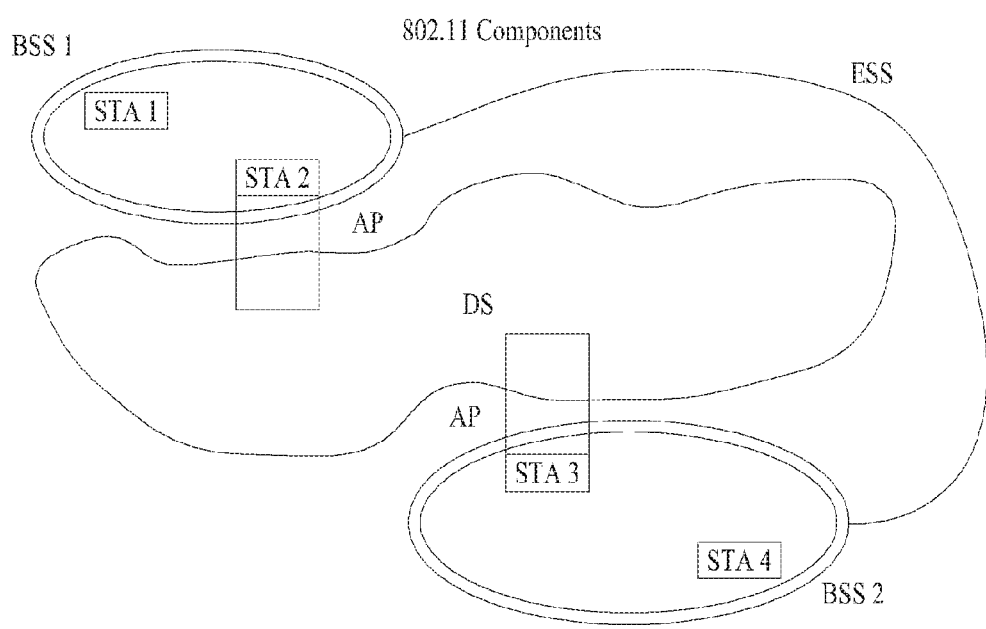
FIG. 2 illustrates another example of a configuration of a wireless LAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Layer Architecture

An operation of an STA in a WLAN system may be described from the perspective of a layer architecture. A processor may implement the layer architecture in terms of device configuration. The STA may have a plurality of layers. For example, the 802.11 standards mainly deal with a MAC sublayer and a PHY layer on a Data Link Layer (DLL). The PHY layer may include a Physical Layer Convergence Protocol (PLCP) entity, a Physical Medium Dependent (PMD) entity, and the like. Each of the MAC sublayer and the PHY layer conceptually includes management entities called MAC sublayer Management Entity (MLME) and Physical Layer Management Entity (PLME). These entities provide layer management service interfaces through which a layer management function is executed.

To provide a correct MAC operation, a Station Management Entity (SME) resides in each STA. The SME is a layer independent entity which may be perceived as being present in a separate management plane or as being off to the side. While specific functions of the SME are not described in detail herein, the SME may be responsible for collecting layer-dependent states from various Layer Management Entities (LMEs) and setting layer-specific parameters to similar values. The SME may execute these functions and implement a standard management protocol on behalf of general system management entities.

The above-described entities interact with one another in various manners. For example, the entities may interact with one another by exchanging GET/SET primitives between them. A primitive refers to a set of elements or parameters related to a specific purpose. An XX-GET.request primitive is used to request a predetermined MIB attribute value (management information-based attribute information). An XX-GET.confirm primitive is used to return an appropriate MIB attribute information value when the Status field indicates "Success" and to return an error indication in the Status field when the Status field does not indicate "Success". An XX-SET.request primitive is used to request setting of an indicated MIB attribute to a predetermined value. When the MIB attribute indicates a specific operation, the MIB attribute requests the specific operation to be performed. An XX-SET.confirm primitive is used to confirm that the indicated MIB attribute has been set to a requested value when the Status field indicates "Success" and to return an error condition in the Status field when the Status field does not indicate "Success". When the MIB attribute indicates a specific operation, it confirms that the operation has been performed.

Also, the MLME and the SME may exchange various MLME_GET/SET primitives through an MLME Service Access Point (MLME_SAP). In addition, various PLME_GET/SET primitives may be exchanged between the PLME and the SME through a PLME_SAP, and exchanged between the MLME and the PLME through an MLME-PLME_SAP.

Link Setup Process

Figure 3:
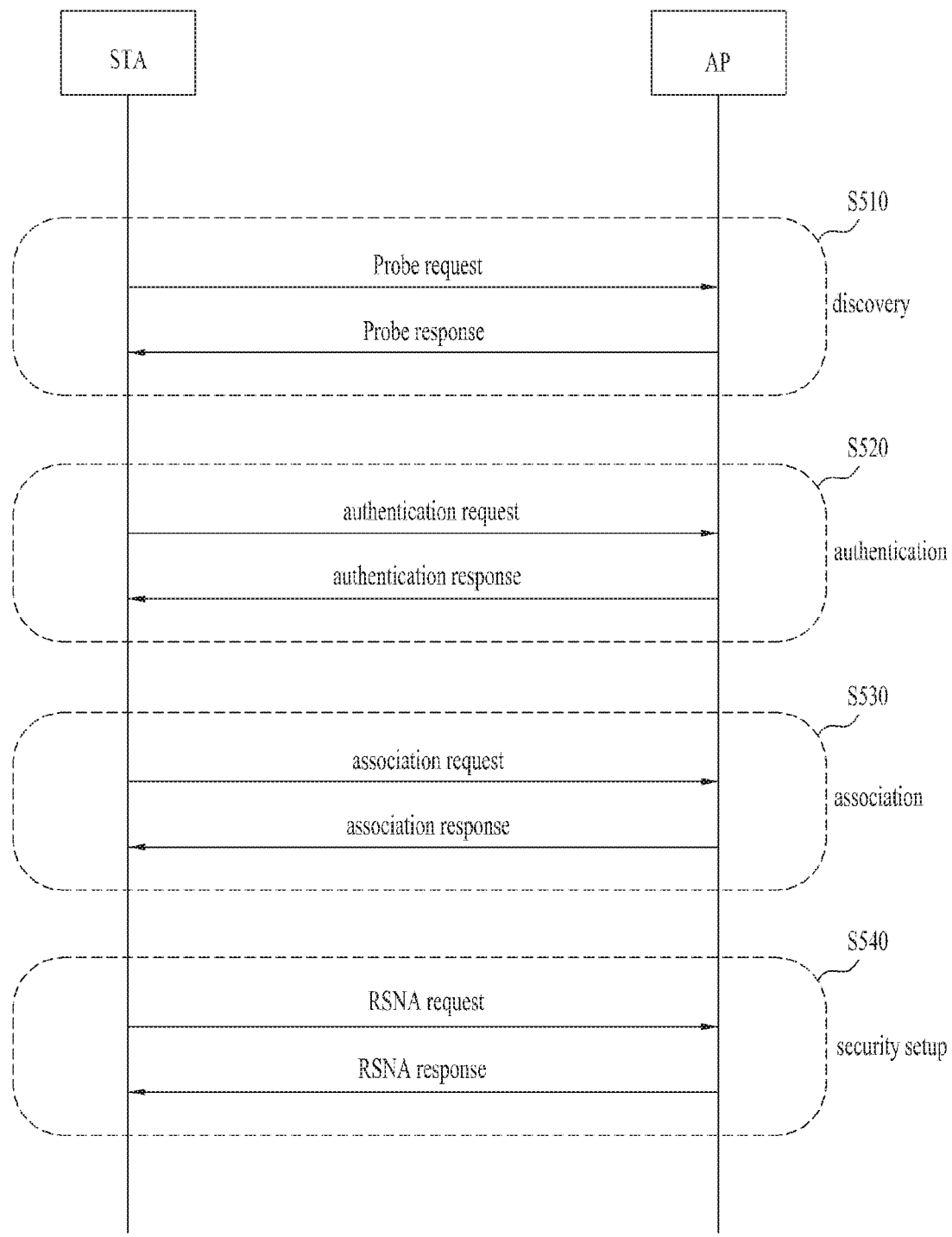
FIG. 3 illustrates a general link setup procedure.

FIG. 3 is a flowchart explaining a general link setup process according to an exemplary embodiment of the present invention.

In order to allow an STA to establish link setup on the network as well as to transmit/receive data over the network, the STA must perform such link setup through processes of network discovery, authentication, and association, and must establish association and perform security authentication. The link setup process may also be referred to as a session initiation process or a session setup process. In addition, an association step is a generic term for discovery, authentication, association, and security setup steps of the link setup process.

Link setup process is described referring to FIG. 3.

In step S510, STA may perform the network discovery action. The network discovery action may include the STA scanning action. That is, STA must search for an available network so as to access the network. The STA must identify a compatible network before participating in a wireless network. Here, the process for identifying the network contained in a specific region is referred to as a scanning process.

The scanning scheme is classified into active scanning and passive scanning.

FIG. 3 is a flowchart illustrating a network discovery action including an active scanning process. In the case of the active scanning, an STA configured to perform scanning transmits a probe request frame and waits for a response to the probe request frame, such that the STA can move between channels and at the same time can determine which Access Point (AP) is present in a peripheral region. A responder transmits a probe response frame, acting as a response to the probe request frame, to the STA having transmitted the probe request frame. In this case, the responder may be an STA that has finally transmitted a beacon frame in a BSS of the scanned channel. In BSS, since the AP transmits the beacon frame, the AP operates as a responder. In IBSS, since STAs of the IBSS sequentially transmit the beacon frame, the responder is not constant. For example, the STA, that has transmitted the probe request frame at Channel #1 and has received the probe response frame at Channel #1, stores BSS-associated information contained in the received probe response frame, and moves to the next channel (for example, Channel #2), such that the STA may perform scanning using the same method (i.e., probe request/response transmission/reception at Channel #2).

Although not shown in FIG. 3, the scanning action may also be carried out using passive scanning AN STA configured to perform scanning in the passive scanning mode waits for a beacon frame while simultaneously moving from one channel to another channel. The beacon frame is one of management frames in IEEE 802.11, indicates the presence of a wireless network, enables the STA performing scanning to search for the wireless network, and is periodically transmitted in a manner that the STA can participate in the wireless network. In BSS, the AP is configured to periodically transmit the beacon frame. In IBSS, STAs of the IBSS are configured to sequentially transmit the beacon frame. If each STA for scanning receives the beacon frame, the STA stores BSS information contained in the beacon frame, and moves to another channel and records beacon frame information at each channel. The STA having received the beacon frame stores BSS-associated information contained in the received beacon frame, moves to the next channel, and thus performs scanning using the same method.

In comparison between the active scanning and the passive scanning, the active scanning is more advantageous than the passive scanning in terms of delay and power consumption.

After the STA discovers the network, the STA may perform the authentication process in step S520. The authentication process may be referred to as a first authentication process in such a manner that the authentication process can be clearly distinguished from the security setup process of step S540.

The authentication process may include transmitting an authentication request frame to an AP by the STA, and transmitting an authentication response frame to the STA by the AP in response to the authentication request frame. The authentication frame used for authentication request/response may correspond to a management frame.

The authentication frame may include an authentication algorithm number, an authentication transaction sequence number, a state code, a challenge text, a Robust Security Network (RSN), a Finite Cyclic Group (FCG), etc. The above-mentioned information contained in the authentication frame may correspond to some parts of information capable of being contained in the authentication request/response frame, may be replaced with other information, or may include additional information.

The STA may transmit the authentication request frame to the AP. The AP may decide whether to authenticate the corresponding STA on the basis of information contained in the received authentication request frame. The AP may provide the authentication result to the STA through the authentication response frame.

After the STA has been successfully authenticated, the association process may be carried out in step S530. The association process may involve transmitting an association request frame to the AP by the STA, and transmitting an association response frame to the STA by the AP in response to the association request frame.

For example, the association request frame may include information associated with various capabilities, a beacon listen interval, a Service Set Identifier (SSID), supported rates, supported channels, RSN, mobility domain, supported operating classes, a TIM (Traffic Indication Map) broadcast request, interworking service capability, etc.

For example, the association response frame may include information associated with various capabilities, a state code, an Association ID (AID), supported rates, an Enhanced Distributed Channel Access (EDCA) parameter set, a Received Channel Power Indicator (RCPI), a Received Signal to Noise Indicator (RSNI), mobility domain, a timeout interval (association comeback time), an overlapping BSS scan parameter, a TIM broadcast response, a Quality of Service (QoS) map, etc.

The above-mentioned information may correspond to some parts of information capable of being contained in the association request/response frame, may be replaced with other information, or may include additional information.

After the STA has been successfully associated with the network, a security setup process may be carried out in step S540. The security setup process of Step S540 may be referred to as an authentication process based on Robust Security Network Association (RSNA) request/response. The authentication process of step S520 may be referred to as a first authentication process, and the security setup process of Step S540 may also be simply referred to as an authentication process.

For example, the security setup process of Step S540 may include a private key setup process through 4-way handshaking based on an Extensible Authentication Protocol over LAN (EAPOL) frame. In addition, the security setup process may also be carried out according to other security schemes not defined in IEEE 802.11 standards.

Medium Access Mechanism

In the IEEE 802.11—based WLAN system, a basic access mechanism of Medium Access Control (MAC) is a Carrier Sense Multiple Access with Collision Avoidance (CSMA/CA) mechanism. The CSMA/CA mechanism is referred to as a Distributed Coordination Function (DCF) of IEEE 802.11 MAC, and basically includes a "Listen Before Talk" access mechanism. In accordance with the above-mentioned access mechanism, the AP and/or STA may perform Clear Channel Assessment (CCA) for sensing an RF channel or medium during a predetermined time interval [for example, DCF Inter-Frame Space (DIFS)], prior to data transmission. If it is determined that the medium is in the idle state, frame transmission through the corresponding medium begins. On the other hand, if it is determined that the medium is in the occupied state, the corresponding AP and/or STA does not start its own transmission, establishes a delay time (for example, a random backoff period) for medium access, and attempts to start frame transmission after waiting for a predetermined time. Through application of a random backoff period, it is expected that multiple STAs will attempt to start frame transmission after waiting for different times, resulting in minimum collision.

In addition, IEEE 802.11 MAC protocol provides a Hybrid Coordination Function (HCF). HCF is based on DCF and Point Coordination Function (PCF). PCF refers to the polling-based synchronous access scheme in which periodic polling is executed in a manner that all reception (Rx) APs and/or STAs can receive the data frame. In addition, HCF includes Enhanced Distributed Channel Access (EDCA) and HCF Controlled Channel Access (HCCA). EDCA is achieved when the access scheme provided from a provider to a plurality of users is contention-based. HCCA is achieved by the contention-free-based channel access scheme based on the polling mechanism. In addition, HCF includes a medium access mechanism for improving Quality of Service (QoS) of WLAN, and may transmit QoS data in both a Contention Period (CP) and a Contention Free Period (CFP).

Figure 4:
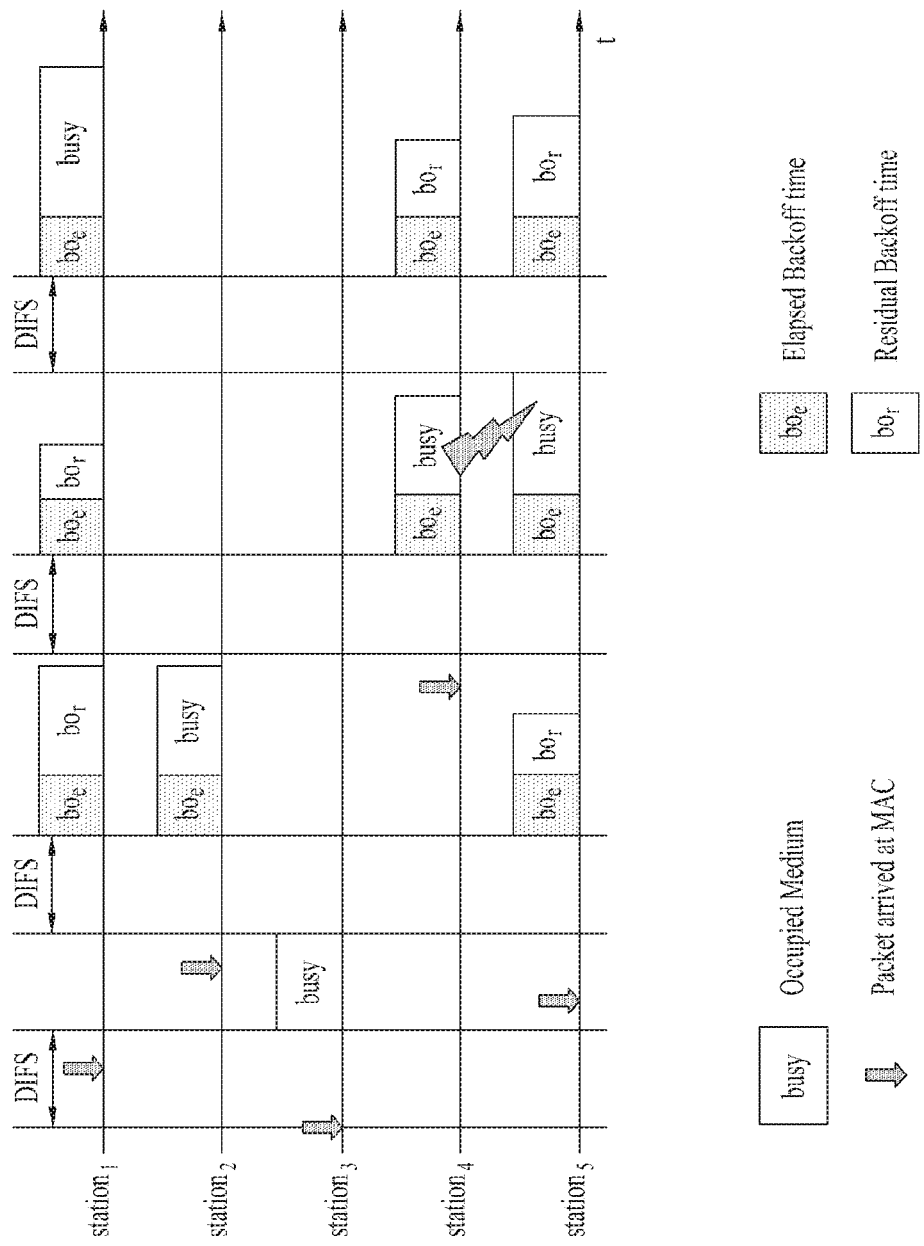
FIG. 4 illustrates a backoff procedure.

FIG. 4 is a conceptual diagram illustrating a backoff process.

Operations based on a random backoff period will hereinafter be described with reference to FIG. 4. If the occupy- or busy-state medium is shifted to an idle state, several STAs may attempt to transmit data (or frame). As a method for implementing a minimum number of collisions, each STA selects a random backoff count, waits for a slot time corresponding to the selected backoff count, and then attempts to start data transmission. The random backoff count has a value of a Packet Number (PN), and may be set to one of 0 to CW values. In this case, CW refers to a Contention Window parameter value. Although an initial value of the CW parameter is denoted by CWmin, the initial value may be doubled in case of a transmission failure (for example, in the case in which ACK of the transmission frame is not received). If the CW parameter value is denoted by CWmax, CWmax is maintained until data transmission is successful, and at the same time it is possible to attempt to start data transmission. If data transmission was successful, the CW parameter value is reset to CWmin Preferably, CW, CWmin, and CWmax are set to 2n−1 (where n=0, 1, 2, . . . ).

If the random backoff process starts operation, the STA continuously monitors the medium while counting down the backoff slot in response to the decided backoff count value. If the medium is monitored as the occupied state, the countdown stops and waits for a predetermined time. If the medium is in the idle state, the remaining countdown restarts.

As shown in the example of FIG. 4, if a packet to be transmitted to MAC of STA3 arrives at the STA3, the STA3 determines whether the medium is in the idle state during the DIFS, and may directly start frame transmission. In the meantime, the remaining STAs monitor whether the medium is in the busy state, and wait for a predetermined time.

During the predetermined time, data to be transmitted may occur in each of STA1, STA2, and STA5. If the medium is in the idle state, each STA waits for the DIFS time and then performs countdown of the backoff slot in response to a random backoff count value selected by each STA. The example of FIG. 4 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupying of the STA2 is finished and the medium re-enters the idle state, each of STA1 and STA5 waits for a predetermined time DIFS, and restarts backoff counting. That is, after the remaining backoff slot as long as the residual backoff time is counted down, frame transmission may start operation. Since the residual backoff time of STA5 is shorter than that of STA1, STA5 starts frame transmission. Meanwhile, data to be transmitted may occur in STA4 while STA2 occupies the medium. In this case, if the medium is in the idle state, STA4 waits for the DIFS time, performs countdown in response to the random backoff count value selected by the STA4, and then starts frame transmission. FIG. 4 exemplarily shows the case in which the residual backoff time of STA5 is identical to the random backoff count value of STA4 by chance. In this case, an unexpected collision may occur between STA4 and STA5. If the collision occurs between STA4 and STA5, each of STA4 and STA5 does not receive ACK, resulting in the occurrence of a failure in data transmission. In this case, each of STA4 and STA5 increases the CW value two times, and STA4 or STA5 may select a random backoff count value and then perform countdown. Meanwhile, STA1 waits for a predetermined time while the medium is in the occupied state due to transmission of STA4 and STA5. In this case, if the medium is in the idle state, STA1 waits for the DIFS time, and then starts frame transmission after lapse of the residual backoff time.

STA Sensing Operation

As described above, the CSMA/CA mechanism includes not only a physical carrier sensing mechanism in which the AP and/or STA can directly sense the medium, but also a virtual carrier sensing mechanism. The virtual carrier sensing mechanism can solve some problems (such as a hidden node problem) encountered in the medium access. For the virtual carrier sensing, MAC of the WLAN system can utilize a Network Allocation Vector (NAV). In more detail, by means of the NAV value, the AP and/or STA, each of which currently uses the medium or has authority to use the medium, may inform another AP and/or another STA for the remaining time in which the medium is available. Accordingly, the NAV value may correspond to a reserved time in which the medium will be used by the AP and/or STA configured to transmit the corresponding frame. AN STA having received the NAV value may prohibit medium access (or channel access) during the corresponding reserved time. For example, NAV may be set according to the value of a 'duration' field of the MAC header of the frame.

The robust collision detect mechanism has been proposed to reduce the probability of such collision, and as such a detailed description thereof will hereinafter be described with reference to FIGS. 7 and 8. Although an actual carrier sensing range is different from a transmission range, it is assumed that the actual carrier sensing range is identical to the transmission range for convenience of description and better understanding of the present invention.

Figure 5:
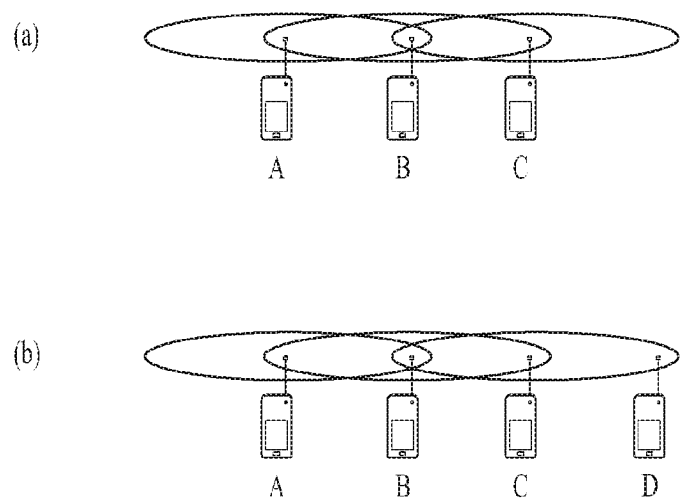
FIG. 5 is an explanatory diagram of a hidden node and an exposed node.

FIG. 5 is a conceptual diagram illustrating a hidden node and an exposed node.

FIG. 5(a) exemplarily shows the hidden node. In FIG. 5(a), STA A communicates with STA B, and STA C has information to be transmitted. In FIG. 5(a), STA C may determine that the medium is in the idle state when performing carrier sensing before transmitting data to STA B, under the condition that STA A transmits information to STA B. Since transmission of STA A (i.e., occupied medium) may not be detected at the location of STA C, it is determined that the medium is in the idle state. In this case, STA B simultaneously receives information of STA A and information of STA C, resulting in the occurrence of collision. Here, STA A may be considered as a hidden node of STA C.

FIG. 5(b) exemplarily shows an exposed node. In FIG. 5(b), under the condition that STA B transmits data to STA A, STA C has information to be transmitted to STA D. If STA C performs carrier sensing, it is determined that the medium is occupied due to transmission of STA B. Therefore, although STA C has information to be transmitted to STA D, the medium-occupied state is sensed, such that the STA C must wait for a predetermined time (i.e., standby mode) until the medium is in the idle state. However, since STA A is actually located out of the transmission range of STA C, transmission from STA C may not collide with transmission from STA B from the viewpoint of STA A, such that STA C unnecessarily enters the standby mode until STA B stops transmission. Here, STA C is referred to as an exposed node of STA B.

Figure 6:
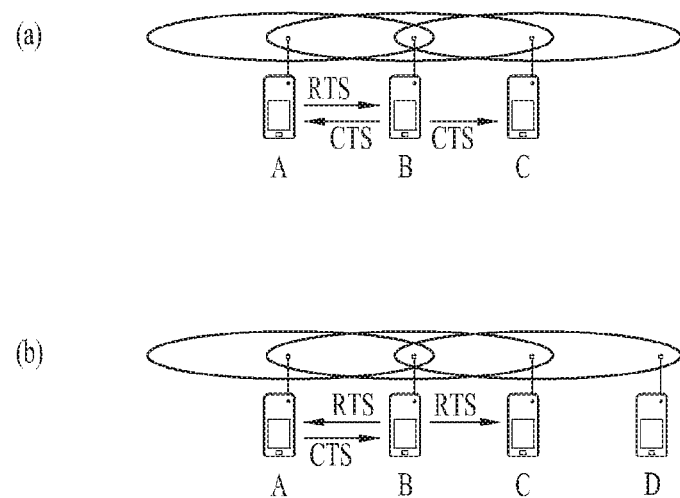
FIG. 6 is an explanatory diagram of RTS and CTS.

FIG. 6 is a conceptual diagram illustrating Request To Send (RTS) and Clear To Send (CTS).

In order to efficiently utilize the collision avoidance mechanism under the above-mentioned situation of FIG. 5, it is possible to use a short signaling packet such as RTS and CTS. RTS/CTS between two STAs may be overheard by peripheral STA(s), such that the peripheral STA(s) may consider whether information is communicated between the two STAs. For example, if STA to be used for data transmission transmits the RTS frame to the STA having received data, the STA having received data transmits the CTS frame to peripheral STAs, and may inform the peripheral STAs that the STA is going to receive data.

FIG. 6(a) exemplarily shows the method for solving problems of the hidden node. In FIG. 6(a), it is assumed that each of STA A and STA C is ready to transmit data to STA B. If STA A transmits RTS to STA B, STA B transmits CTS to each of STA A and STA C located in the vicinity of the STA B. As a result, STA C must wait for a predetermined time until STA A and STA B stop data transmission, such that collision is prevented from occurring.

FIG. 6(b) exemplarily shows the method for solving problems of the exposed node. STA C performs overhearing of RTS/CTS transmission between STA A and STA B, such that STA C may determine no collision although it transmits data to another STA (for example, STA D). That is, STA B transmits an RTS to all peripheral STAs, and only STA A having data to be actually transmitted can transmit a CTS. STA C receives only the RTS and does not receive the CTS of STA A, such that it can be recognized that STA A is located outside of the carrier sensing range of STA C.

Power Management

As described above, the WLAN system has to perform channel sensing before STA performs data transmission/reception. The operation of always sensing the channel causes persistent power consumption of the STA. There is not much difference in power consumption between the Reception (Rx) state and the Transmission (Tx) state. Continuous maintenance of the Rx state may cause large load to a power-limited STA (i.e., STA operated by a battery). Therefore, if STA maintains the Rx standby mode so as to persistently sense the channel, power is inefficiently consumed without special advantages in terms of WLAN throughput. In order to solve the above-mentioned problem, the WLAN system supports a Power Management (PM) mode of the STA.

The PM mode of the STA is classified into an active mode and a Power Save (PS) mode. The STA is basically operated in the active mode. The STA operating in the active mode maintains an awake state. If the STA is in the awake state, the STA may normally operate such that it can perform frame transmission/reception, channel scanning, or the like. On the other hand, STA operating in the PS mode is configured to switch from the doze state to the awake state or vice versa. STA operating in the sleep state is operated with minimum power, and the STA does not perform frame transmission/reception and channel scanning.

The amount of power consumption is reduced in proportion to a specific time in which the STA stays in the sleep state, such that the STA operation time is increased in response to the reduced power consumption. However, it is impossible to transmit or receive the frame in the sleep state, such that the STA cannot mandatorily operate for a long period of time. If there is a frame to be transmitted to the AP, the STA operating in the sleep state is switched to the awake state, such that it can transmit/receive the frame in the awake state. On the other hand, if the AP has a frame to be transmitted to the STA, the sleep-state STA is unable to receive the frame and cannot recognize the presence of a frame to be received. Accordingly, STA may need to switch to the awake state according to a specific period in order to recognize the presence or absence of a frame to be transmitted to the STA (or in order to receive a signal indicating the presence of the frame on the assumption that the presence of the frame to be transmitted to the STA is decided).

The AP may transmit a beacon frame to STAs in a BSS at predetermined intervals. The beacon frame may include a traffic indication map (TIM) information element. The TIM information element may include information indicating that the AP has buffered traffic for STAs associated therewith and will transmit frames. TIM elements include a TIM used to indicate a unitcast frame and a delivery traffic indication map (DTIM) used to indicate a multicast or broadcast frame.

Figure 7:
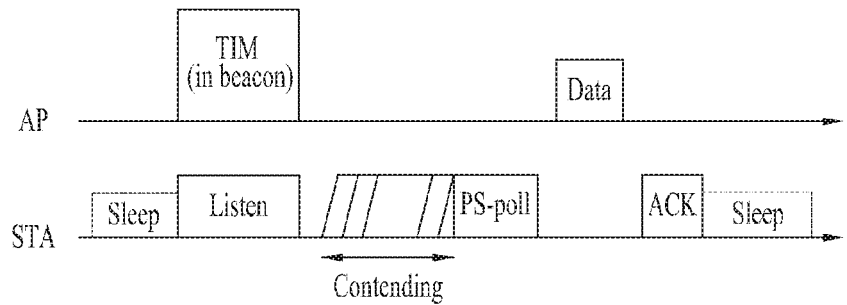
FIGS. 7 to 9 are explanatory diagrams of operation of an STA that has received TIM.
Figure 8:
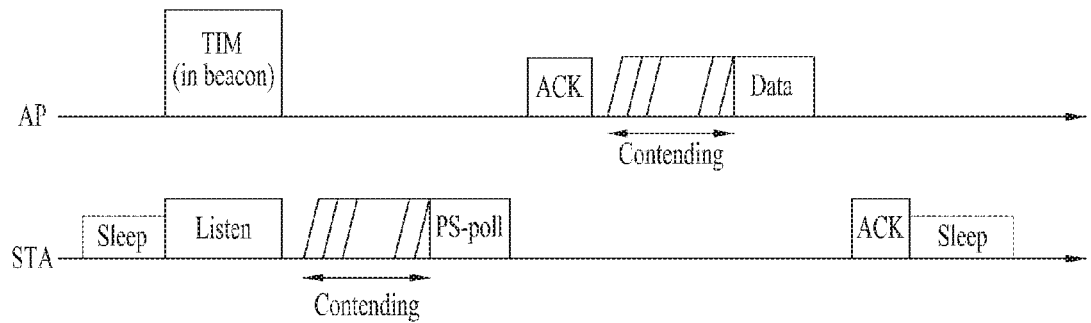
Figure 9:
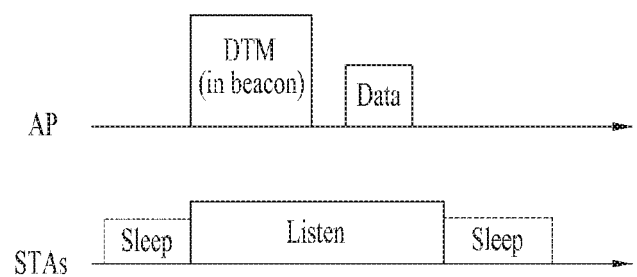

FIGS. 7 to 9 are conceptual diagrams illustrating detailed operations of the STA having received a Traffic Indication Map (TIM).

Referring to FIG. 7, STA is switched from the sleep state to the awake state so as to receive the beacon frame including a TIM from the AP. STA interprets the received TIM element such that it can recognize the presence or absence of buffered traffic to be transmitted to the STA. After STA contends with other STAs to access the medium for PS-Poll frame transmission, the STA may transmit the PS-Poll frame for requesting data frame transmission to the AP. The AP having received the PS-Poll frame transmitted by the STA may transmit the frame to the STA. STA may receive a data frame and then transmit an ACK frame to the AP in response to the received data frame. Thereafter, the STA may re-enter the sleep state.

As can be seen from FIG. 7, the AP may operate according to the immediate response scheme, such that the AP receives the PS-Poll frame from the STA and transmits the data frame after lapse of a predetermined time [for example, Short Inter-Frame Space (SIFS)]. In contrast, the AP having received the PS-Poll frame does not prepare a data frame to be transmitted to the STA during the SIFS time, such that the AP may operate according to the deferred response scheme, and as such a detailed description thereof will hereinafter be described with reference to FIG. 8.

The STA operations of FIG. 8 in which the STA is switched from the sleep state to the awake state, receives a TIM from the AP, and transmits the PS-Poll frame to the AP through contention are identical to those of FIG. 7. If the AP having received the PS-Poll frame does not prepare a data frame during the SIFS time, the AP may transmit the ACK frame to the STA instead of transmitting the data frame. If the data frame is prepared after transmission of the ACK frame, the AP may transmit the data frame to the STA after completion of such contending. STA may transmit the ACK frame indicating successful reception of a data frame to the AP, and may be shifted to the sleep state.

FIG. 9 shows the exemplary case in which AP transmits DTIM. STAs may be switched from the sleep state to the awake state so as to receive the beacon frame including a DTIM element from the AP. STAs may recognize that multicast/broadcast frame(s) will be transmitted through the received DTIM. After transmission of the beacon frame including the DTIM, AP may directly transmit data (i.e., multicast/broadcast frame) without transmitting/receiving the PS-Poll frame. While STAs continuously maintains the awake state after reception of the beacon frame including the DTIM, the STAs may receive data, and then switch to the sleep state after completion of data reception.

Frame Structure

Figure 10:
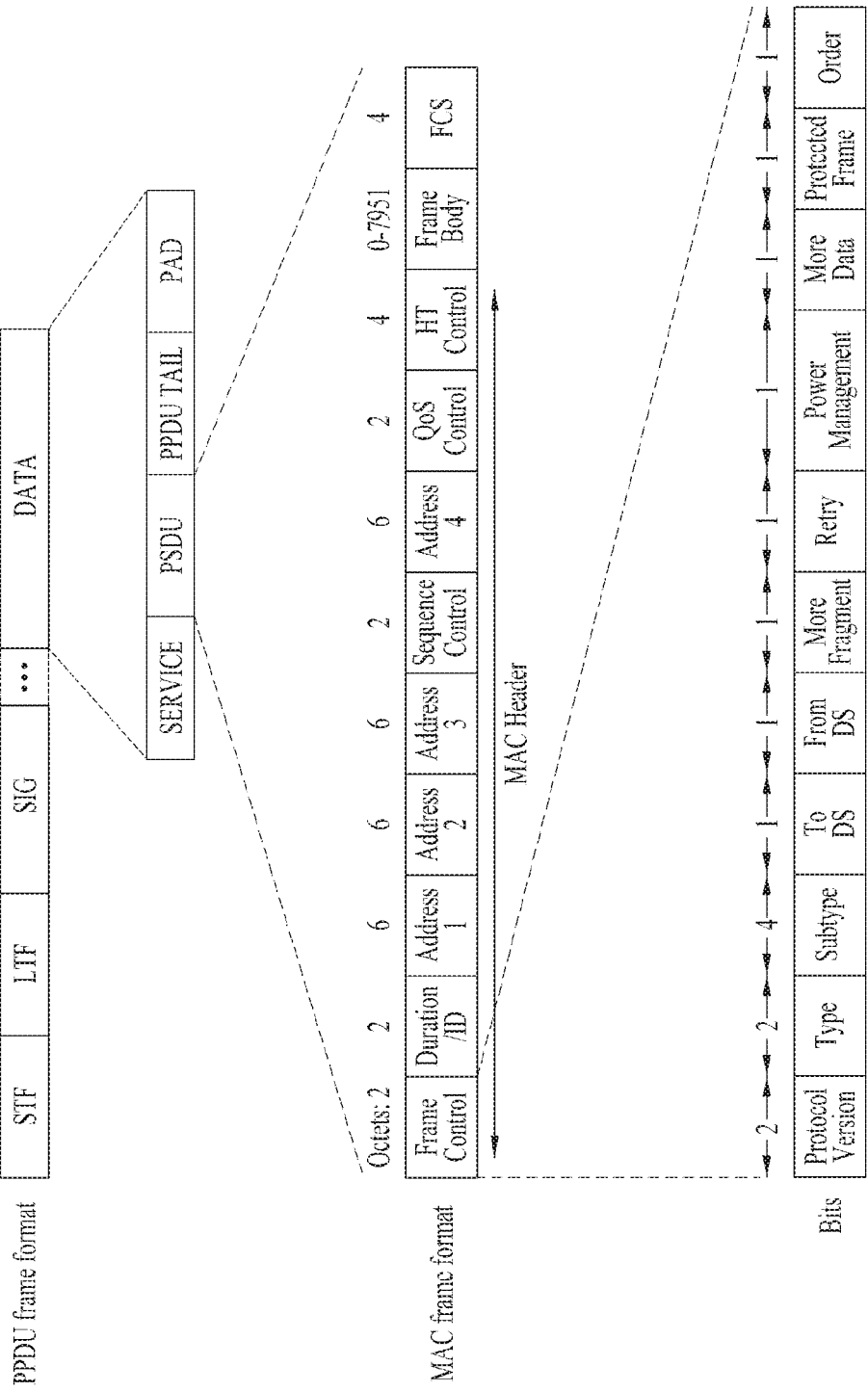
FIG. 10 is an explanatory diagram of an exemplary frame structure used in an IEEE 802.11 system.

FIG. 10 is an explanatory diagram of an exemplary frame structure used in an IEEE 802.11 system.

A PPDU (Physical Layer Protocol Data Unit) frame format may include an STF (Short Training Field), an LTF (Long Training Field), a SIG (SIGNAL) field and a data field. The most basic (e.g., non-HT (High Throughput)) PPDU frame format may include only an L-STF (Legacy-STF), an L-LTF (Legacy-LTF), a SIG field and a data field.

The STF is a signal for signal detection, AGC (Automatic Gain Control), diversity selection, accurate time synchronization, etc., and the LTF is a signal for channel estimation, frequency error estimation, etc. The STF and LTF may be collectively called a PLCP preamble. The PLCP preamble may be regarded as a signal for OFDM physical layer synchronization and channel estimation.

The SIG field may include a RATE field and a LENGTH field. The RATE field may include information about modulation and coding rates of data. The LENGTH field may include information about the length of data. In addition, the SIG field may include a parity bit, a SIG TAIL bit, etc.

The data field may include a SERVICE field, a PSDU (Physical layer Service Data Unit) and a PPDU TAIL bit. The data field may also include padding bits as necessary. Some bits of the SERVICE field may be used for synchronization of a descrambler at a receiving end. The PSDU corresponds to an MPDU (MAC Protocol Data Unit) defined in the MAC layer and may include data generated/used in a higher layer. The PPDU TAIL bit may be used to return an encoder to state 0. The padding bits may be used to adjust the length of the data field to a predetermined unit.

The MPDU is defined depending on various MAC frame formats, and a basic MAC frame includes a MAC header, a frame body and an FCS (Frame Check Sequence). The MAC frame may be composed of the MPDU and transmitted/received through PSDU of a data part of the PPDU frame format.

The MAC header includes a frame control field, a duration/ID field, an address field, etc. The frame control field may include control information necessary for frame transmission/reception. The duration/ID field may be set to a time to transmit a relevant frame.

The duration/ID field included in the MAC header may be set to a 16-bit length (e.g., B0 to B15). Content included in the duration/ID field may depend on frame type and sub-type, whether transmission is performed for a CFP (contention free period), QoS capability of a transmission STA and the like. (i) In a control frame corresponding to a sub-type of PS-Poll, the duration/ID field may include the AID of the transmission STA (e.g., through 14 LSBs) and 2 MSBs may be set to 1. (ii) In frames transmitted by a PC (point coordinator) or a non-QoS STA for a CFP, the duration/ID field may be set to a fixed value (e.g., 32768). (iii) In other frames transmitted by a non-QoS STA or control frames transmitted by a QoS STA, the duration/ID field may include a duration value defined per frame type. In a data frame or a management frame transmitted by a QoS STA, the duration/ID field may include a duration value defined per frame type. For example, B15=0 of the duration/ID field indicates that the duration/ID field is used to indicate a TXOP duration, and B0 to B14 may be used to indicate an actual TXOP duration. The actual TXOP duration indicated by B0 to B14 may be one of 0 to 32767 and the unit thereof may be microseconds (μs). However, when the duration/ID field indicates a fixed TXOP duration value (e.g., 32768), B15 can be set to 1 and B0 to B14 can be set to 0. When B14=1 and B15=1, the duration/ID field is used to indicate an AID, and B0 to B13 indicate one AID of 1 to 2007. Refer to the IEEE 802.11 standard document for details of Sequence Control, QoS Control, and HT Control subfields of the MAC header.

The frame control field of the MAC header may include Protocol Version, Type, Subtype, To DS, From DS, More Fragment, Retry, Power Management, More Data, Protected Frame and Order subfields. Refer to the IEEE 802.11 standard document for contents of the subfields of the frame control field.

WUR (Wake-Up Radio)

First, a general description of a Wake-Up Radio Receiver (WURx), which is compatible with a WLAN system (e.g., 802.11), will now be given with reference to FIG. 11.

Figure 11:
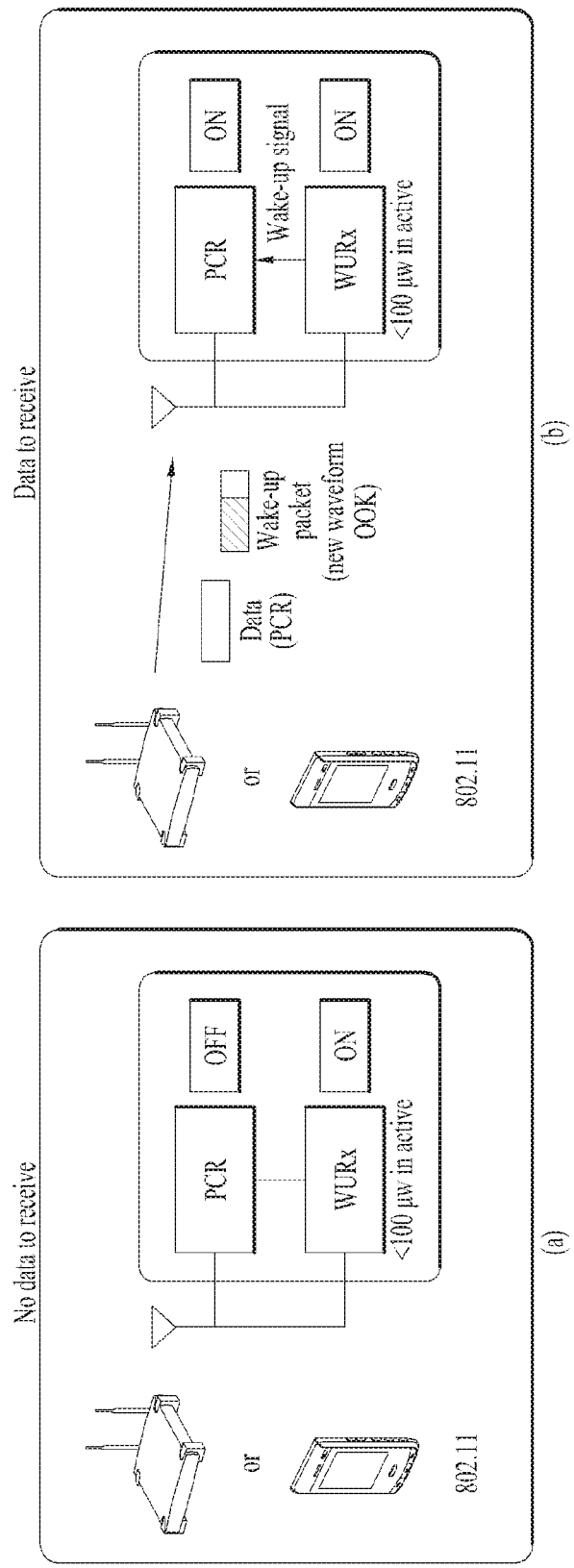
FIG. 11 is an explanatory diagram of a WUR receiver usable in a WLAN system (e.g., 802.11).

Referring to FIG. 11, an STA may support a Primary Connectivity Radio (PCR) (e.g., IEEE 802.11a/b/g/n/ac/ax WLAN), which is used for main wireless communication, and a Wake-Up Radio (WUR) (e.g., IEEE 802.11ba).

The PCR is used for data transmission and reception and may be turned off when there is no data to be transmitted and received. In the case in which the PCR is turned off, if there is a packet to be received, a WURx of the STA may wake the PCR. Therefore, user data is transmitted through the PCR.

The WURx may not be used for user data and may function only to wake a PCR transceiver. The WURx may be a simple type of receiver without a transmitter and is activated while the PCR is turned off. In an active state, target power consumption of the WURx desirably does not exceed 100 microwatts (μW). To operate at such low power, a simple modulation scheme, for example, On-Off Keying (OOK), may be used and a narrow bandwidth (e.g., 4 MHz or 5 MHz) may be used. A reception range (e.g., distance) aimed by the WURx may conform to current 802.11.

Figure 12:
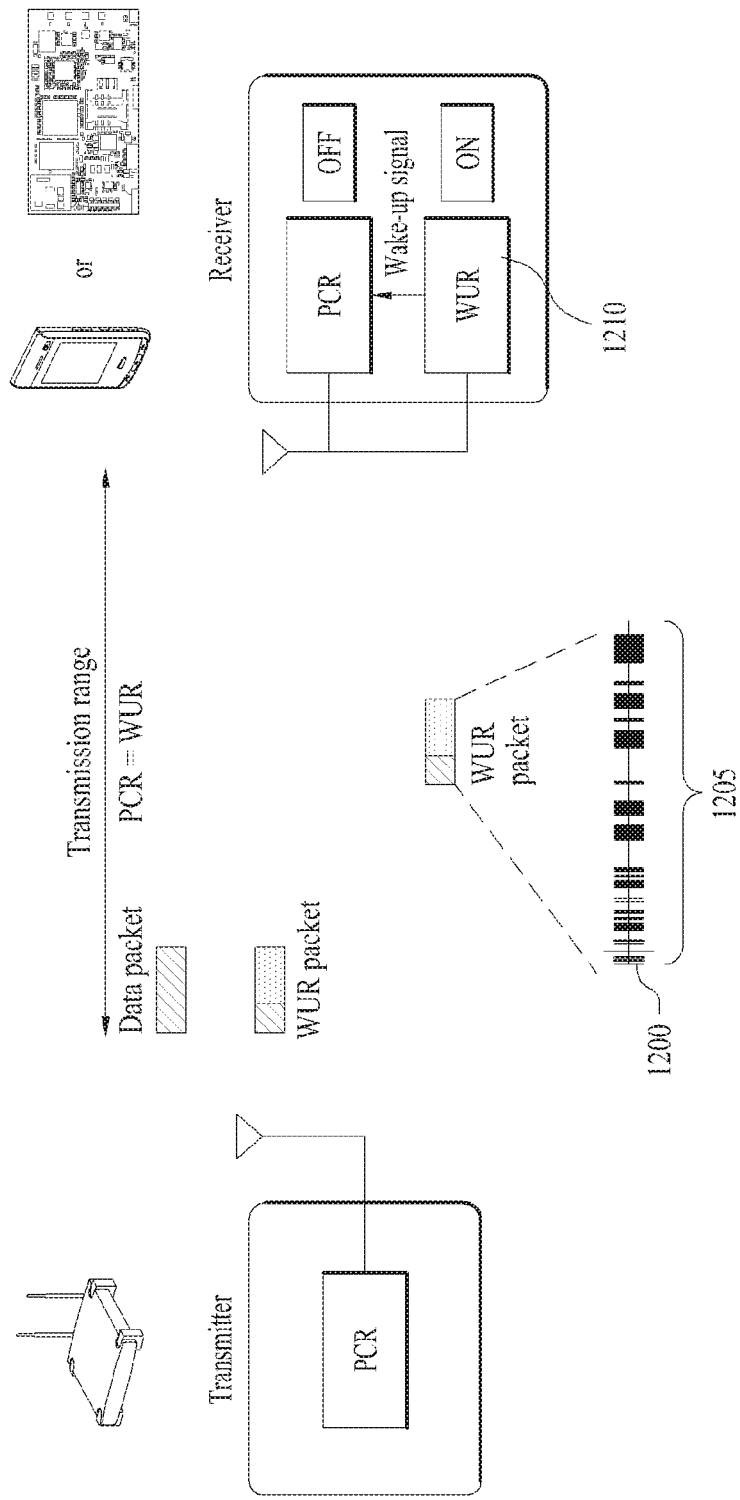
FIG. 12 is an explanatory diagram of operation of a WUR receiver.

FIG. 12 is an explanatory diagram of design and operation of a WUR packet.

Referring to FIG. 12, the WUR packet may include a PCR part 1200 and a WUR part 1205.

The PCR part 1200 is used for coexistence with a legacy WLAN system and the PCR part may be referred to as a WLAN preamble. To protect the WUR packet from other PCR STAs, at least one of an L-STF, an L-LTF, or an L-SIG of a legacy WLAN may be included in the PCR part 1200. Therefore, a third party legacy STA may be aware, through the PCR part 1200 of the WUR packet, that the WUR packet is not intended therefor and a medium of a PCR has been occupied by another STA. However, the WURx does not decode the PCR part of the WUR packet. This is because the WURx supporting narrowband and OOK demodulation does not support reception of a PCR signal.

At least a portion of the WUR part 1205 may be modulated using OOK. For example, the WUR part may include at least one of a WUR preamble, a MAC header (e.g., a receiver address, etc.), a frame body, or a Frame Check Sequence (FCS). OOK modulation may be performed by correcting an OFDM transmitter.

A WURx 1210 may consume very low power less than 100 μW as described above and may be implemented by a small, simple OOK demodulator.

Thus, since the WUR packet needs to be designed to be compatible with the WLAN system, the WUR packet may include a preamble (e.g., an OFDM scheme) of a legacy WLAN and a new Low-Power (LP)-WUR signal waveform (e.g., an OOK scheme).

Figure 13:
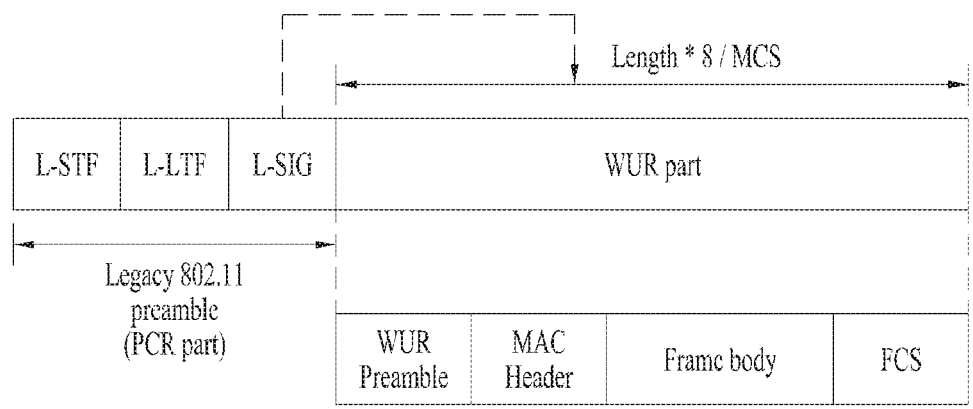
FIG. 13 illustrates an example of a WUR packet.

FIG. 13 illustrates an example of a WUR packet. The WUR packet of FIG. 13 includes a PCR part (e.g., a legacy WLAN preamble) for coexistence with a legacy STA.

Referring to FIG. 13, the legacy WLAN preamble may include an L-STF, an L-LTF, and an L-SIG. A WLAN STA (e.g., a third party) may detect the beginning of the WUR packet through the L-STF. The WLAN STA (e.g., the third party) may detect the end of the WUR packet through the L-SIG. For example, the L-SIG field may indicate the length of a (e.g., OOK-modulated) payload of the WUR packet.

A WUR part may include at least one of a WUR preamble, a MAC header, a frame body, or an FCS. The WUR preamble may include, for example, a PN sequence. The MAC header may include a receiver address. The frame body may include other information necessary for wake-up. The FCS may include a Cyclic Redundancy Check (CRC).

Figure 14:
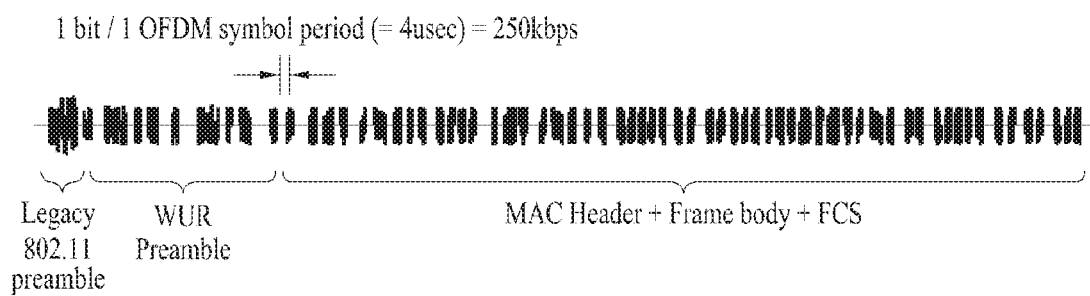
FIG. 14 illustrates the waveform of a WUR packet.

FIG. 14 illustrates the waveform of the WUR packet of FIG. 13. Referring to FIG. 14, in an OOK-modulated WUR part, one bit per OFDM symbol period (e.g., 4 μsec) may be transmitted. Therefore, a data rate of the WUR part may be 250 kbps.

Figure 15:
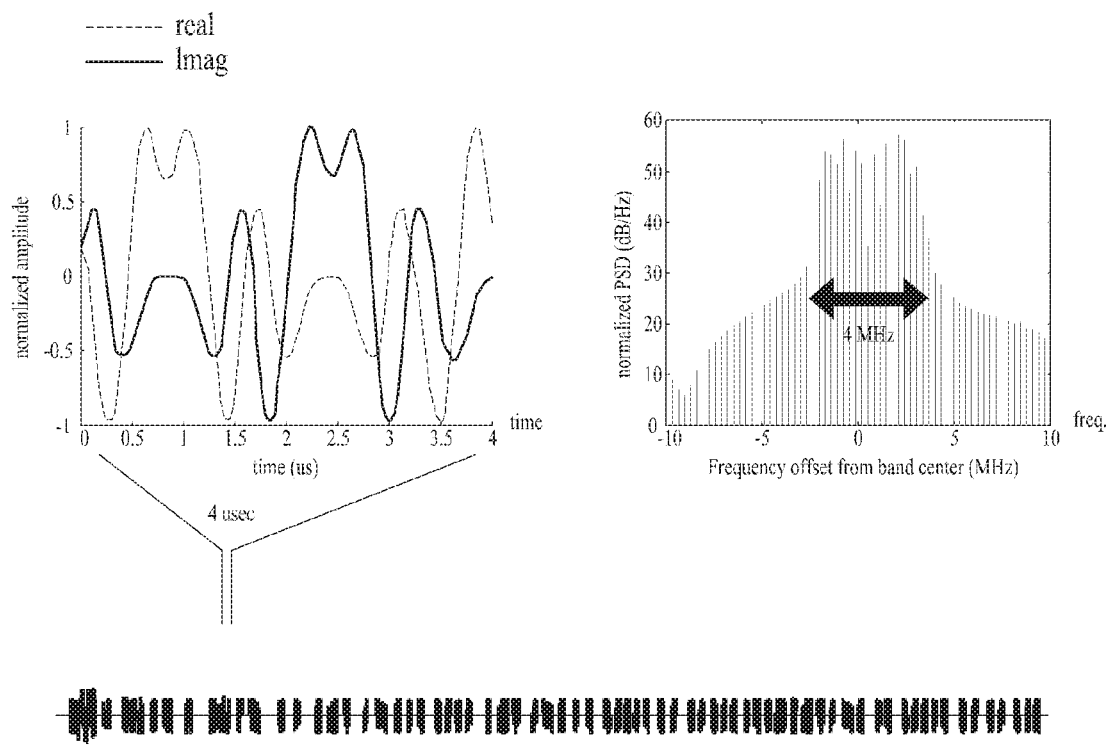
FIG. 15 is an explanatory diagram of a WUR packet generated using an OFDM transmitter of a WLAN.

FIG. 15 is an explanatory diagram of a WUR packet generated using an OFDM transmitter of a WLAN. In the WLAN, a Phase Shift Keying (PSK)-OFDM transmission scheme is used. If the WUR packet is generated by adding a separate OOK modulator for OOK modulation, implementation cost of a transmitter may increase. Therefore, a method of generating the OOK-modulated WUR packet by reusing an OFDM transmitter is considered.

According to an OOK modulation scheme, a bit value of 1 is modulated to a symbol having power of a threshold value or more (i.e., on) and a bit value of 0 is modulated to a symbol having power lower than the threshold value (i.e., off). Obviously, the bit value of 1 may be defined as power 'off'.

Thus, in the OOK modulation scheme, the bit value of I/O is indicated through power-on/off at a corresponding symbol position. The above-described simple OOK modulation/demodulation scheme is advantageous in that power consumed to detect/demodulate a signal of a receiver and cost for receiver implementation may be reduced. OOK modulation for turning a signal of/off may be performed by reusing a legacy OFDM transmitter.

The left graph of FIG. 15 illustrates a real part and an imaginary part of a normalized amplitude during one symbol period (e.g., 4 μsec) for an OOK-modulated bit value 1 by reusing an OFDM transmitter of a legacy WLAN. Since an OOK-modulated result for a bit value 0 corresponds to power-off, this is not illustrated.

The right graph of FIG. 15 illustrates normalized Power Spectral Density (PSD) for an OOK-modulated bit value 1 on the frequency domain by reusing the OFDM transmitter of the legacy WLAN. For example, a center 4 MHz may be used for WUR in a corresponding band. In FIG. 15, although WUR operates in a bandwidth of 4 MHz, this is for convenience of description and frequency bandwidths of other sizes may be used. In this case, it is desirable that WUR operate in a narrower bandwidth than an operating bandwidth of a PCR (e.g., the legacy WLAN) in order to reduce power.

In FIG. 15, it is assumed that a subcarrier width (e.g., subcarrier spacing) is 312.5 kHz and an OOK pulse bandwidth corresponds to 13 subcarriers. The 13 subcarriers correspond to about 4 MHz (i.e., 4.06 MHz=13*312.5 kHz) as described above.

In the legacy OFDM transmitter, an input sequence of Inverse Fast Fourier Transform (IFFT) is defined as s={13 subcarrier tone sequence} and IFFT for the sequence s is performed as Xt=IFFT(s) and then a Cyclic Prefix (CP) of a length of 0.8 μsec is added, thereby generating a symbol period of about 4 μs.

The WUR packet may also be referred to as a WUR signal, a WUR frame, or a WUR PPDU. The WUR packet may be a packet for broadcast/multicast (e.g., a WUR beacon) or a packet for unicast (e.g., a packet for ending and then waking up a WUR mode of a specific WUR STA).

Figure 16:
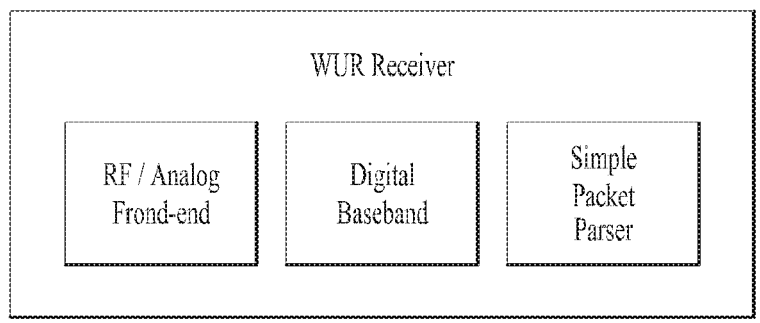
FIG. 16 illustrates the structure of a WUR receiver.

FIG. 16 illustrates the structure of a WURx. Referring to FIG. 16, the WURx may include an RF/analog front-end, a digital baseband processor, and a simple packet parser. FIG. 16 illustrates an exemplary structure of the WURx and the WURx of the present invention is not limited to the configuration of FIG. 16.

Hereinbelow, a WLAN STA having the WURx is simply referred to as a WUR STA. The WUR STA may be simply referred to as an STA.

WUR Medium Access Control

General: A re-discovery mechanism may be provided to enable an AP to re-discover a WUR STA which is in a WUR mode. An STA does not transmit a WUR frame while a PCR is turned off.

WUR Negotiation: The STA may perform a WUR negotiation procedure through the AP and the PCR before the STA enters the WUR mode. A WUR action frame for WUR negotiation may be defined. The WUR action frame may be transmitted through the PCR. The WUR action frame may include a WUR ID (WID). The WID may uniquely identify a WUR STA belonging to a BSS of the AP. The WID may be included in a unicast wake-up frame to identify an immediate recipient WUR STA. The AP may determine a WUR operation channel in a band supported by the STA operating in the WUR mode.

Figure 17:
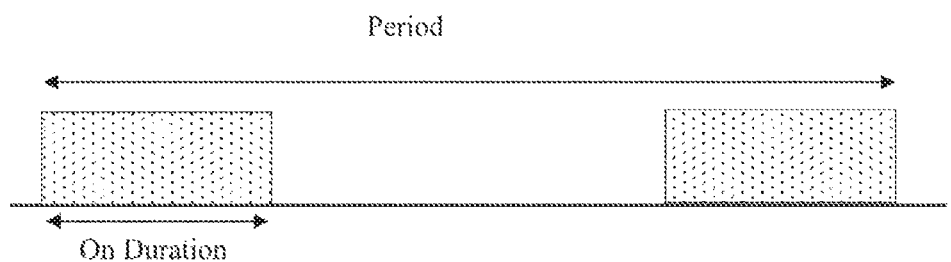
FIG. 17 illustrates a WUR duty cycle mode.

WURx Schedule: The STA may have a duty cycle mode for WURx. Referring to FIG. 17, the period of the WUR duty cycle may be a multiple of a basic unit. The basic unit may be indicated by the AP. An on-duration in each period for the WUR duty cycle may be larger than or equal to a minimum wake-up duration. The minimum wake-up duration is indicated by the AP. The AP may determine and indicate a starting point for WUR duty cycle schedule.

WUR Beacon: The AP may periodically transmit a WUR beacon frame. A WUR beacon interval may be indicated in a WUR mode element through the PCR. A synchronization mechanism for operation of the WUR duty cycle mode may be provided. For example, a partial Timing Synchronization Function (TSF) may be transmitted through the WUR beacon frame.

WUR Mode: The AP may provide explicit WUR mode signaling for causing the WUR STA to enter the WUR mode through the PCR. The WUR STA is notified of a WUR operating parameter through WUR mode signaling. If the STA of the WUR mode is in a doze state, a WURx follows duty cycle schedule (e.g., the WURx is always on) agreed upon between the AP and the STA. An existing negotiated service period between the AP and the STA for PCR schedule of the STA (e.g., a target wake-up time, schedule for a wireless network management sleep mode) may be suspended. If the service period is suspended, the STA does not need to wake up during the service period. If the service period is suspended, parameters of the service period for PCR schedule of the STA are still saved by the AP and the STA. If the STA of the WUR mode is in a PS mode, the STA may not receive a PCR beacon frame. For example, while the STA configured to periodically wake up for a PCR PS mode operation and receive a PCR beacon frame operates in the WUR mode, the STA may not receive the PCR beacon frame.

Channel Access: The AP may use EDCA as a channel access mechanism for transmitting a WUR frame. The AP may re-use 4 Access Categories (ACs) of PCR EDCA and EDCA parameters to transmit the WUR frame. The WUR frame may include a unicast wake-up frame, a multicast wake-up frame, and a WUR beacon frame. The AP may use any AC to transmit the multicast wake-up frame and/or the WUR frame. If there is no buffered frame to be transmitted to the STA, the AP may use any AC to transmit the unicast wake-up frame. After transmitting the WUR frame using Enhanced Distributed Channel Access Function (EDCAF) of a specific AC, the AP should not update a Contention Window (CW) and retry count of the AC. After identifying failure for the unicast wake-up frame transmitted using EDCAF of the specific AC, the AP should not update the CW and the retry count of the AC.

Wake-up Operation: The AP may transmit a trigger frame in 11ax to solicit a response frame from STA(s) after transmitting the wake-up frame to the STA(s).

Unicast Wake-up Operation: After the AP transmits the unicast wake-up frame, the AP waits for a predetermined timeout interval. If the AP receives any transmission from the STA during the timeout interval, the wake-up frame transmission is successful. Unlike this, if the AP fails to receive any transmission from the STA during the timeout interval, the wake-up frame transmission fails and the AP may retransmit the wake-up frame. If the STA receives the unicast wake-up frame through WUR, the STA should transmit a response frame to the AP using the PCR in response to the unicast wake-up frame.

Multicast Wake-up Operation: A multi-user wake-up frame may be defined to wake up multiple WUR mode STAs. After transmission of the broadcast wake-up frame, the AP may transmit broadcast/multicast frame through the PCR after a preparation period.

Figure 18:
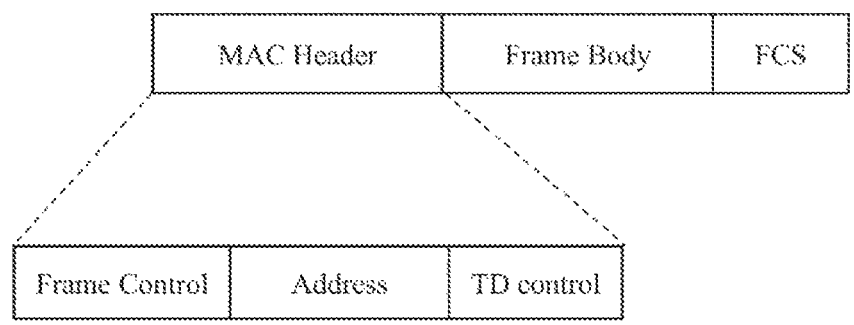
FIG. 18 illustrates an example of a MAC frame included in a WUR PPDU.

WUR Frame Format: FIG. 18 illustrates an example of a MAC layer frame (i.e., a WUR MAC frame) included in a WUR PPDU. The length of a MAC header may be fixed. An Address field of the MAC header may include at least one identifier. A Frame Control (FC) field of the MAC header includes a Type field indicating a type of the WUR frame. The Type field may indicate, for example, whether the WUR frame is a WUR beacon or a wake-up frame. A Type Dependent (TD) Control field of the MAC header includes TD control information of the WUR frame. A Frame Body field is optional and may be omitted from the WUR frame. For example, all STAs do not always support reception of the WUR frame including the Frame Body field and may support or may not support reception of the WUR frame including the Frame Body field according to the STAs. A Frame Check Sequence (FCS) field may include a CRC of the WUR frame.

(i) In the WUR beacon, an identifier of a WUR transmitter is configured in the Address field of the MAC header. A partial TSF is included in the TD control information of the WUR beacon.

(ii) The wake-up frame includes at least one of a transmitter identifier or a receiver identifier in the Address field. The Address field of the unicast wake-up frame includes a WUR identifier (ID) that identifies a receiver. The AP may indicate BSS parameter update or a group addressed Bufferable Unit (BU) by increasing a counter included in the wake-up frame.

Length Indication for WUR PPDU

First, a legacy WLAN system will now be described. The length of an MPDU is indicated through a Length field of an L-SIG and an STA may be aware of the end of a PPDU through the Length field.

WLAN STAs (e.g., 3rd parties) operating in a PCR mode may be aware of the end of a WUR frame through a legacy 802.11 preamble (e.g., Length field of an L-SIG) included in the WUR frame and may not transmit PCR frames thereof during a duration in which the WUR frame is transmitted by configuring a channel as a busy state up to the end of the WUR frame.

Meanwhile, a WUR STA that waits for a payload of the WUR frame to be received in a WUR mode does not or cannot decode a non-WUR part (e.g., legacy 802.11 preamble) included in the WUR frame and may decode only a WUR part.

For example, the WUR part of the WUR frame is transmitted in a frequency resource region (e.g., a resource region consisting of 13 subcarriers) smaller than 20 MHz in which a legacy preamble is transmitted and the STA in a WUR mode monitors the small resource region. As a result, the STA in the WUR mode fails to confirm the Length field of the L-SIG and thus may not be aware of the length of the WUR frame.

Thus, the WUR STA may not be aware of the end of the WUR frame because the WUR STA could not read the Length field of the L-SIG included in the WUR frame. In addition, the WUR STA has difficulty in accurately decoding the WUR frame because the WUR STA is not aware of location information of an FCS of the WUR frame.

Hereinafter, embodiments of a method of indicating the length of the WUR frame for the WUR STA in order to solve the above problems will be described. Indexes assigned in below-described examples are for convenience of description and each example does not always configure an independent invention. A combination of examples having different indexes may be implemented as one invention within the range not conflicting with each other.

Example 1-1

According to an embodiment of the present invention, length information regarding MAC content (e.g., MPDU) of the WUR frame may be indicated through a WUR preamble.

As an example, a WUR SIG field is included in the WUR preamble and the length information is included in the WUR SIG field. The length information of the WUR SIG field may indicate length from the WUR SIG field to the end of the WUR frame. As another example, the length information of the WUR SIG field may indicate a timing at which the WUR frame is ended.

Figure 19:
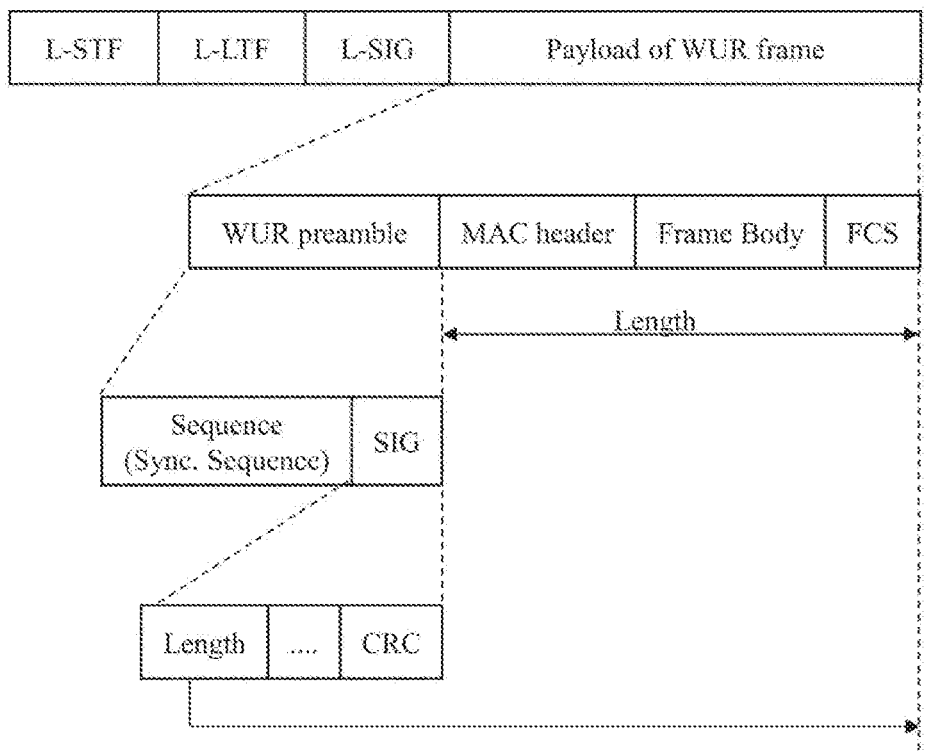
FIG. 19 illustrates a WUR frame indicating length information through a WUR preamble according to an embodiment of the present invention.

FIG. 19 illustrates an example of indicating length information through a WUR preamble according to an embodiment of the present invention.

Referring to FIG. 19, the WUR preamble includes a WUR Sequence field and a WUR SIG field. The WUR Sequence field may include a sequence for synchronization and may be simply referred to as a Synchronization field. The WUR SIG field may include information needed to decode MAC content (e.g., MAC header+Frame Body+FCS).

The length information included in the WUR SIG field may indicate the length of content (e.g., MAC header+frame body+FCS) except for the WUR preamble. A byte unit may be used to indicate length. For example, the length information included in the WUR SIG field may indicate how many bytes are used for MAC header+frame body+FCS. A value of a Length field included in the WUR SIG field may indicate an MPDU of a specific size. For example, Length=0 may indicate a fixed-size WUR beacon frame, Length=1 may indicate a fixed-size wake-up frame, Length=2 may indicate a fixed-size discovery frame, and Length=special value (e.g., 3) may indicate a variable WUR frame. If the Length field indicates reception of a maximum WUR frame/PPDU length, the STA performs reception operations corresponding to a maximum size of the WUR frame/PPDU. The maximum size of the WUR frame/PPDU may be determined in a system or may be acquired by the STA in a negotiation process with an AP. While the STA performs the reception operations corresponding to the maximum size of the WUR frame/PPDU, the STA may acquire accurate length information of a MAC frame from the MAC frame included in the WUR frame/PPDU or stop the WUR frame/PPDU reception operation in the last part of the MAC frame.

Example 1-2

According to an embodiment of the present invention, the length information may be located prior to the MAC content (e.g., MAC header+frame body+FCS) of the WUR frame. For example, the length information may correspond to an MPDU delimiter.

Figure 20:
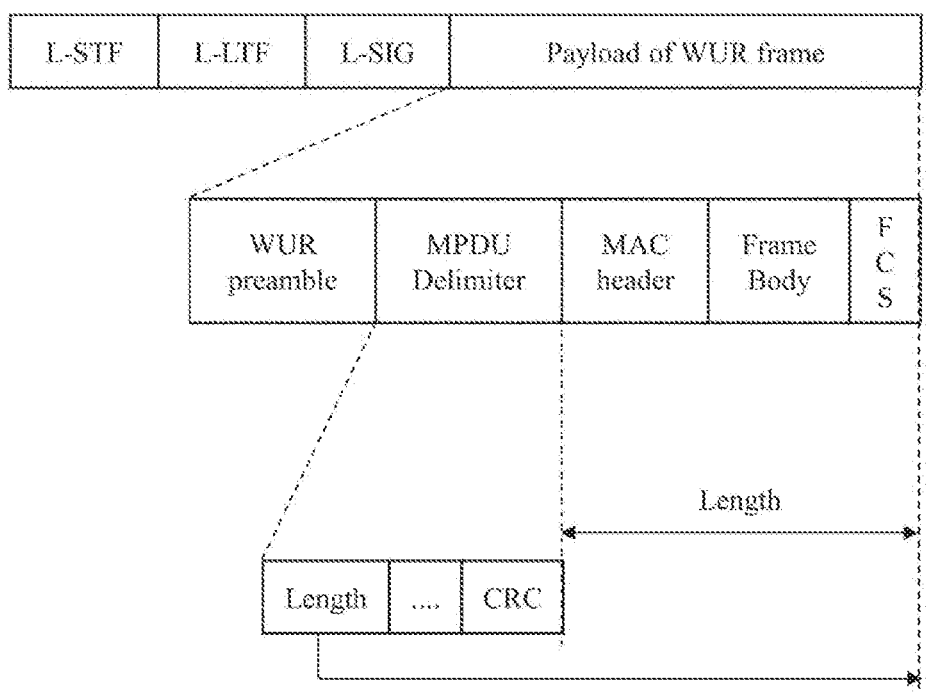
FIG. 20 illustrates a WUR frame indicating length information through an MPDU delimiter according to an embodiment of the present invention.

FIG. 20 illustrates an MPDU delimiter according to an embodiment of the present invention. The MPDU delimiter of FIG. 20 may be referred to by other names.

Referring to FIG. 20, an indicator including length information (e.g., MPDU delimiter) may be attached in front of MAC content (e.g., in front of a MAC header). The indicator including the length information may indicate the length of the MAC content (e.g., MAC header+frame body+FCS). For example, the indicator including the length information may indicate length from the start of the MAC header to a point at which the FCS is ended.

The MPDU delimiter may include the FCS together with the length information. The FCS of the MPDU delimiter may correspond to a CRC of the MPDU delimiter including the length information. The term MPDU delimiter may be represented by other names. The value of a Length field may indicate an MPDU of a specific length. For example, Length=0 may indicate a fixed-size WUR beacon frame, Length=1 may indicate a fixed-size wake-up frame, Length=2 may indicate a fixed-size discovery frame, and Length=special value (e.g., 3) may indicate a variable WUR frame. If the Length field indicates reception of a maximum WUR frame/PPDU length, the STA performs reception operations corresponding to a maximum size of the WUR frame/PPDU. The maximum size of the WUR frame/PPDU may be determined in a system or may be acquired by the STA in a negotiation process with the AP. While the STA performs the reception operations corresponding to the maximum size of the WUR frame/PPDU, the STA may acquire accurate length information of the MAC frame from the MAC frame included in the WUR frame/PPDU or stop the WUR frame/PPDU reception operation in the last part of the MAC frame.

Example 1-3

According to an embodiment of the present invention, the length information may be included in the MAC content of the WUR frame. For example, the MAC header may include the length information. As an example, only when the WUR frame includes the frame body, the MAC header may include the length information. As another example, the MAC header may include the length information regardless of whether the WUR frame includes the frame body.

Figure 21:
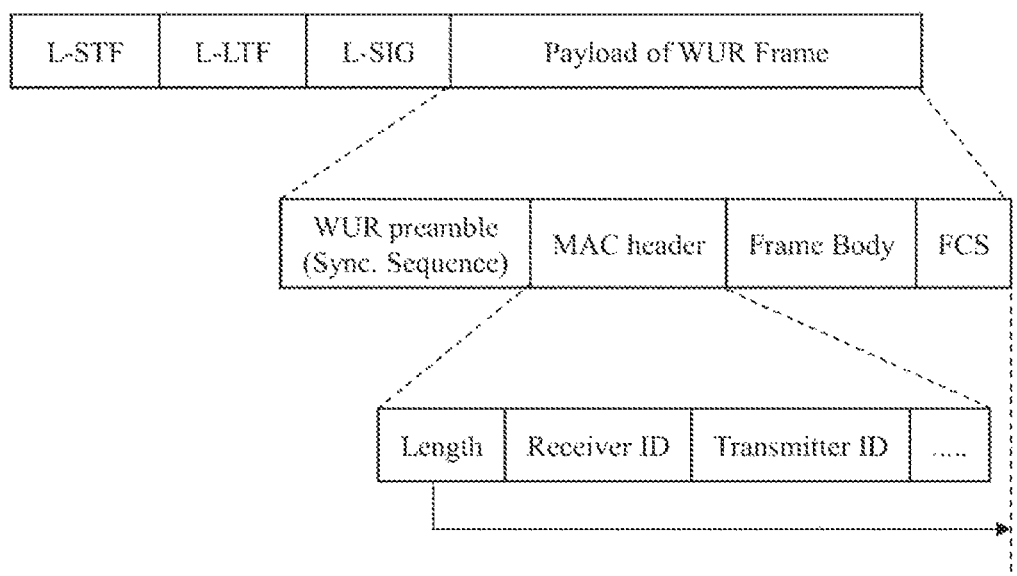
FIG. 21 illustrates a WUR frame indicating length information through MAC content according to an embodiment of the present invention.

FIG. 21 illustrates a WUR frame indicating length information through MAC content according to an embodiment of the present invention.

Referring to FIG. 21, a MAC header may include a Length field indicating the length information. The length information may indicate length up to the end of the MAC content (e.g., up to an FCS).

As an example, the length information may indicate the entire length of the MAC content in predetermined bytes. Specifically, the length information may indicate the length of MAC header+frame body+FCS, including the Length field. Alternatively, the length information may indicate, in bytes, the length of the frame body except for the MAC header or the length of frame body+FCS in bytes except for the MAC header. If the length information (e.g., Length field) is located at the front part of the MAC header, a CRC attached after the Length field may be transmitted. In this case, the CRC may be a CRC for the Length field.

For convenience of description, although it is assumed that the Length field is located at the front part of the MAC header, the present invention is not limited thereto. The location of the Length field may be changed or may be implicitly indicated through another field of the MAC header. Alternatively, the length information may be joint-encoded with other MAC header information.

Padding bits (e.g., 0 to 7 bits) for byte alignment may be included in the MAC header or the frame body. For example, if a configuration unit of the MAC header or the frame body is bytes and the actual number N of information bits of the MAC header or the frame body is not a multiple of 8, at least one padding bit (e.g., 8-(N Modulo 8) padding bits) may be attached to the MAC header or the frame body.

For convenience of description, although it has been assumed that a unit indicating the length information described above is bytes, the present invention is not limited thereto. Although the Length field included in the L-SIG in the legacy system is 11 bits, the length of the length information included in the WUR part of the WUR frame may be set to be smaller than 11 bits. For example, the length information of the WUR frame included in the PCR part is 11 bits, but the length information of the WUR frame included in the WUR part may be set to be smaller than 11 bits. Thus, in order to reduce the length information included in the WUR part, the unit of the length information included in the WUR part may be a unit (e.g., 2 bytes, 3 bytes, 4 bytes, 5 bytes, etc.) larger than one byte.

Table 1 to Table 3 below list various examples of the length information included in the WUR part.

TABLE 1

| 2 bytes | | 3 bytes | | 4 bytes | | 5 bytes | |
|---|---|---|---|---|---|---|---|
| Length index | Length value | Length index | Length value | Length index | Length value | Length index | Length value |
| 0 | 0 | 0 | 0 | 0 | 0 | 0 | 0 |
| 1 | 2 | 1 | 3 | 1 | 4 | 1 | 5 |
| 2 | 4 | 2 | 6 | 2 | 8 | 2 | 10 |
| 3 | 6 | 3 | 9 | 3 | 12 | 3 | 15 |
| 4 | 8 | 4 | 12 | 4 | 16 | 4 | 20 |
| ... | ... | ... | ... | ... | ... | ... | ... |

TABLE 2

| 2 bytes | | 3 bytes | | 4 bytes | | 5 bytes | |
|---|---|---|---|---|---|---|---|
| Length index | Length value | Length index | Length value | Length index | Length value | Length index | Length value |
| 0 | 2 | 0 | 3 | 0 | 4 | 0 | 5 |
| 1 | 4 | 1 | 6 | 1 | 8 | 1 | 10 |
| 2 | 6 | 2 | 9 | 2 | 12 | 2 | 15 |
| 3 | 8 | 3 | 12 | 3 | 16 | 3 | 20 |
| 4 | 10 | 4 | 15 | 4 | 20 | 4 | 25 |
| ... | ... | ... | ... | ... | ... | ... | ... |

TABLE 3

| 2 bytes | | 3 bytes | | 4 bytes | | 5 bytes | |
| --- | --- | --- | --- | --- | --- | --- | --- |
| Length index | Length value | Length index | Length value | Length index | Length value | Length index | Length value |
| 0 | 0 | 0 | 0 | 0 | 0 | 0 | 0 |
| 1 | 1 | 1 | 1 | 1 | 1 | 1 | 1 |
| 2 | 2 | 2 | 3 | 2 | 4 | 2 | 5 |
| 3 | 4 | 3 | 6 | 3 | 8 | 3 | 10 |
| 4 | 6 | 4 | 9 | 4 | 12 | 4 | 15 |
| ... | ... | ... | ... | ... | ... | ... | ... |

As another example, in order to more accurately indicate length and reduce overhead caused by attachment of padding bits, the unit of the length information may be a unit (e.g., the unit of 4 bits) smaller than one byte. As an example, if the length information is indicated in units of 4 bits, the size of padding bits may be one of 0 to 3 bits.

Example 2

Figure 22:
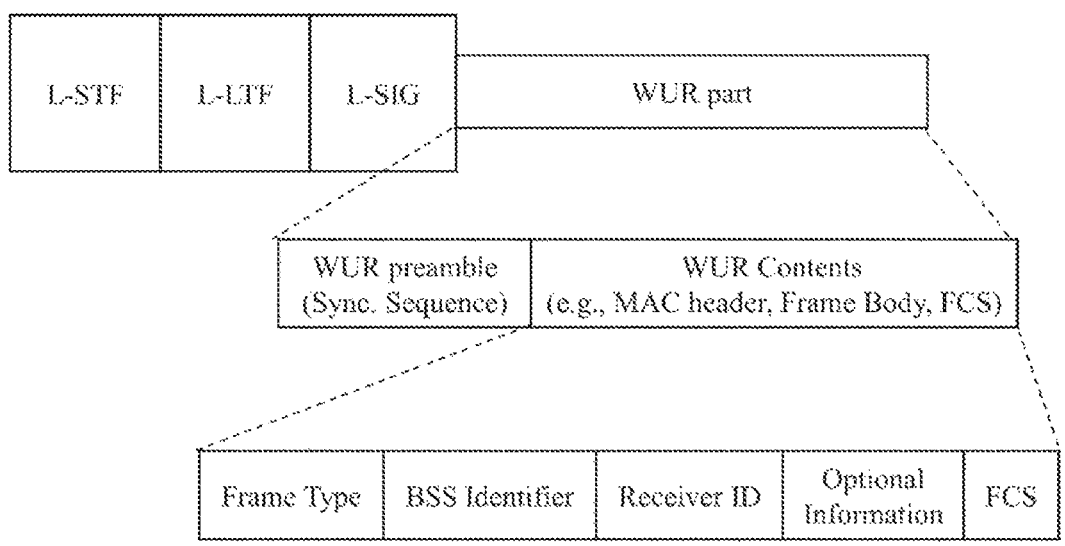
FIG. 22 illustrates an exemplary WUR frame according to an embodiment of the present invention.

FIG. 22 illustrates an exemplary WUR frame according to an embodiment of the present invention.

Referring to FIG. 22, content of the WUR frame may include at least one of a frame type, an address field (e.g., a BSS ID and/or a receiver ID), optional information, or an FCS. A portion of the content of the WUR frame may be referred to as a MAC header and the other portion may correspond to a frame body.

Example 2-1

Figure 23:
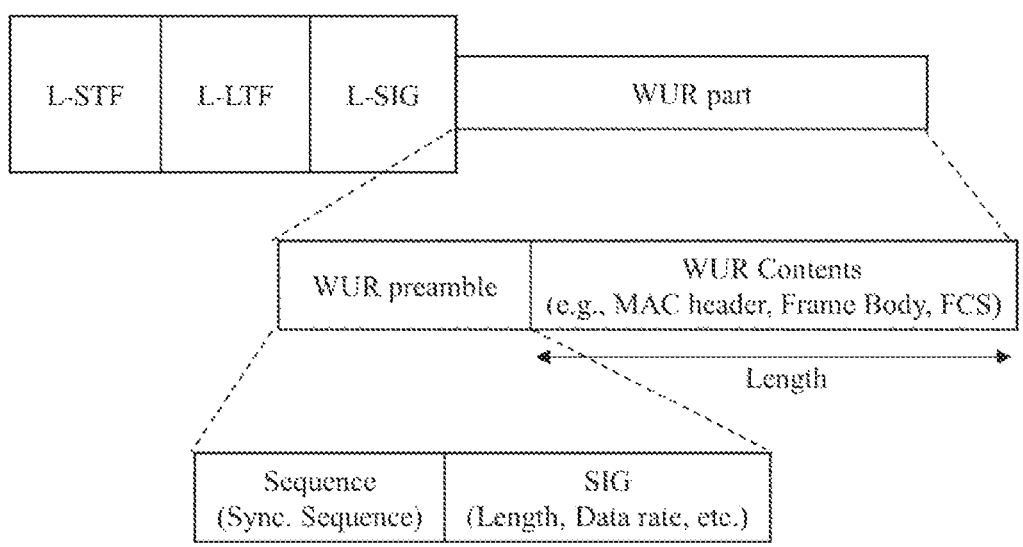
FIG. 23 illustrates an exemplary WUR frame indicating length information through a WUR preamble according to an embodiment of the present invention.

FIG. 23 illustrates an exemplary WUR frame indicating length information through a WUR preamble according to an embodiment of the present invention.

Referring to FIG. 23, the WUR preamble includes a WUR sequence (e.g., synchronization sequence) and a WUR SIG field. A WUR mode STA may acquire time synchronization for the WUR frame through the WUR sequence and perform Automatic Gain Control (AGC). For example, the WUR sequence performs a function similar to an L-STF of a PCR.

The WUR SIG field may carry information needed to decode WUR frame content. For example, the WUR SIG field may perform a function similar to a SIG (e.g., L-SIG, HT-SIG, VHT-SIG-A/B, HE-SIG-A/B, etc.) in a legacy WLAN system and include a part (e.g., CRC or parity check) for checking whether corresponding information is valid.

An AP may include the length information in the WUR SIG field. The WUR STA may be aware of the length of the WUR frame content through the acquired length information.

As an example, the length information may indicate length based on the number of bytes or the number of symbols.

A length index having a relatively small size may be configured in the length information, instead of a corresponding length value. In this case, each length index may indicate a fixed frame size.

For example, the length of a fixed length of the WUR frame as listed in Table 4 may be indicated according to a WUR frame type indicated through a Frame Type field of a MAC header. Although it is assumed in Table 4 that the WUR frame is one of fixed lengths M, N, P, and Q for convenience of description, the present invention is not limited thereto. M, N, P, and Q may be integers larger than 0.

TABLE 4

| Frame Type | WUR Frame | Length |
| --- | --- | --- |
| 0 | WUR Beacon | M bits |
| 1 | Unicast WUR Packet | N bits |
| 2 | Broadcast WUR Packet | P bits |
| 3 | Multi-user WUR Packet | Q bits |

The length index when WUR frames of 4 different lengths are present as listed in Table 4 and the length index is configured in the WUR frame separately from frame type information may be as listed in Table 5 for example.

TABLE 5

| 2 bits Length index | Length |
| --- | --- |
| 00 | M bits |
| 01 | N bits |
| 10 | P bits |
| 11 | Q bits |

As another example, when the number of fixed lengths of the WUR frame is 5 to 8, the length index may be defined as 3 bits. Table 6 shows another example of the length index.

TABLE 6

| 3 bits Length index | Length | Frame |
| --- | --- | --- |
| 000 | M bits | WUR Beacon |
| 001 | N bits | Unicast WUR Packet |
| 010 | P bits | Broadcast WUR Packet |
| 011 | Q bits | Multi-user WUR Packet Type 1 |
| 100 | R bits | Multi-user WUR Packet Type 2 |
| 101 | S bits | Multi-user WUR Packet Type 3 |
| 110 | T bits | Group WUR packet |
| 111 | Reserved | |

Table 4 to Table 6 show various examples of the present invention and may be modified into other types.

Figure 24:
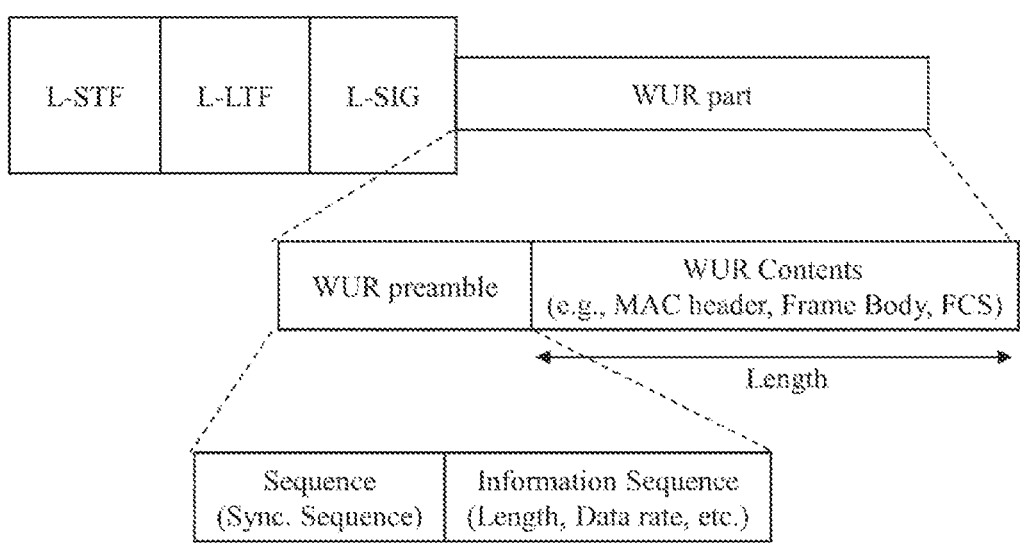
FIG. 24 illustrates an exemplary WUR frame indicating length information through a WUR preamble according to another embodiment of the present invention.

FIG. 24 illustrates an exemplary WUR frame indicating length information through a WUR preamble according to another embodiment of the present invention.

Referring to FIG. 24, as a method of indicating the length information through the WUR preamble, the length information may be indicated through a sequence (e.g., synchronization sequence or information sequence) instead of a WUR SIG field. For example, a plurality of WUR synchronization/information sequences available for the WUR preamble may be defined and the length information may be indicated according to which one of the plural WUR synchronization/information sequences is used.

Table 7 lists different information sequences indicating different length information.

TABLE 7

| Information sequence | Length |
|---|---|
| x | M bits |
| x + 1 | N bits |
| x + 2 | O bits |
| x + 3 | P bits |
| ... | ... |
| x + n | Z bits |

Figure 25:
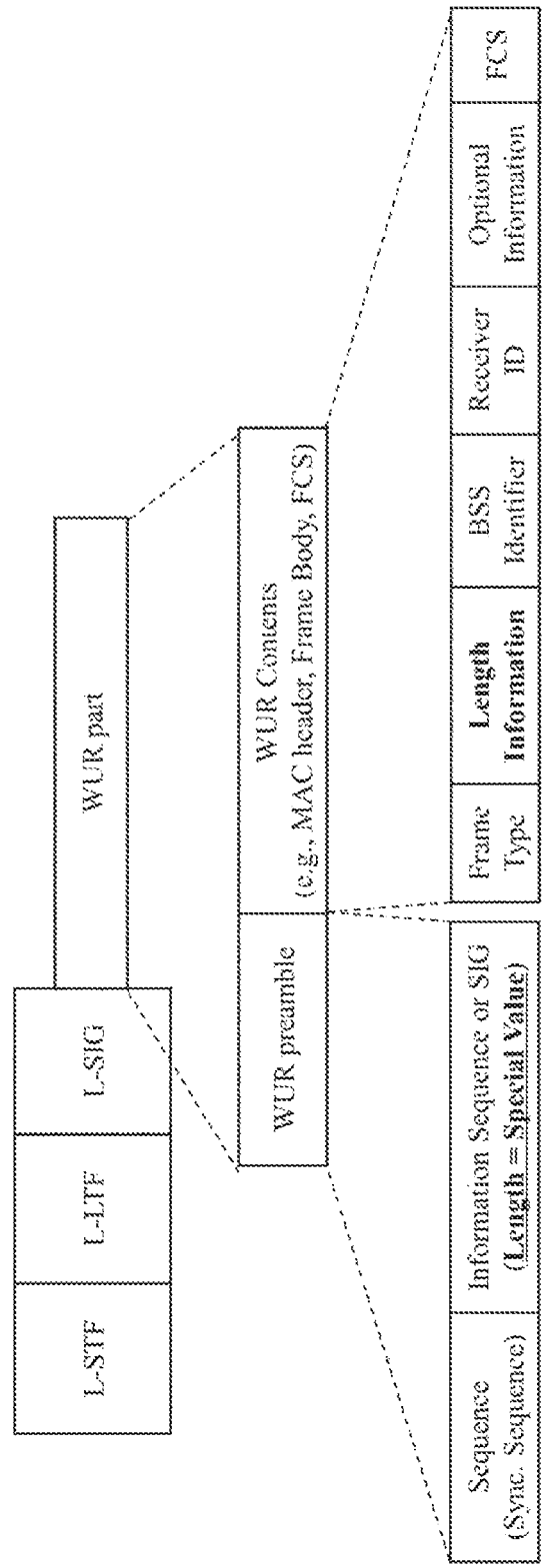
FIG. 25 illustrates another exemplary WUR frame indicating length information according to the present invention.

FIG. 25 illustrates another exemplary WUR frame indicating length information according to the present invention.

As an example, the WUR frame may have a variable length rather than one of N fixed lengths defined in a system. A preamble (e.g., information sequence or WUR SIG field) of the WUR frame may indicate that the WUR frame has a variable length.

As an example, if a Length Information/Index field of the WUR SIG field is configured as a special value (e.g., all 0s, all 1s, etc.) or the information sequence is configured as a specific sequence, this may indicate that the WUR frame has a variable length. If the WUR frame has a variable length, information about an accurate length of the WUR frame may be included in content of the WUR frame rather than the preamble of the WUR frame.

Referring to FIG. 25, the length information indicating an actual length of the WUR frame of a variable length may be located after a Frame Type field in WUR frame content. However, according to an embodiment, the location of the length information may be changed. For example, the length information may be located at the first part in the WUR frame content. Information needed to calculate the length of the WUR frame content having a variable length may be included in the length information.

Example 2-2

Figure 26:
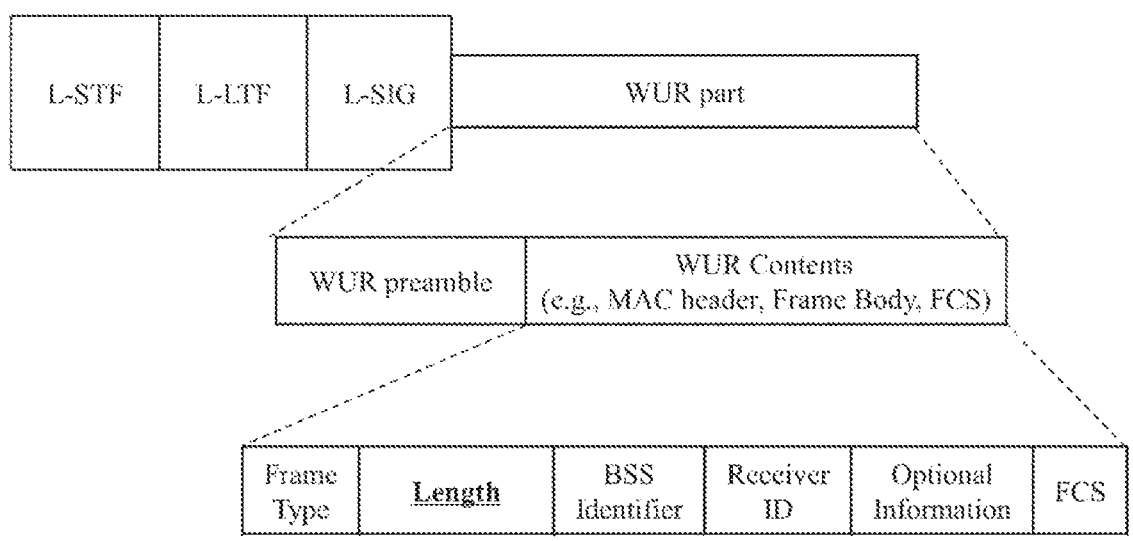
FIG. 26 illustrates a WUR frame indicating length information according to an embodiment of the present invention.

FIG. 26 illustrates a WUR frame indicating length information according to an embodiment of the present invention.

Referring to FIG. 26, the length of the WUR frame may be indicated through WUR frame content. For example, explicit length information may be included in the WUR frame content.

The WUR STA may calculate, using the length information, a length by which the WUR frame content is present, that is, the length of the WUR frame.

Example 2-3

FIG. 27 illustrates a WUR frame according to an embodiment of the present invention.

Referring to FIG. 27, WUR content may include a Frame Type field and a Length Extension field. For example, the Frame Type field and the Length Extension field may be included in a MAC header.

For example, the Length Extension field may be a 1-bit indicator. The Length Extension field indicates whether the WUR frame has a predefined/fixed length for a corresponding frame type. If the length of the WUR frame is fixed according to frame type, the Length Extension field is set to 0 and, if the length is not fixed (e.g., a variable WUR frame), the Length Extension field is set to 1. If the Length Extension field is set to 1, the WUR frame may have a longer or shorter length than the predefined length for the corresponding frame type. Length information indicating the actual length of the WUR frame/content may be additionally included in the WUR frame content.

Referring to (a) of FIG. 27, since Length Extension=0, the length of the WUR frame/content is fixed and the WUR frame content does not include the length information.

Referring to (b) of FIG. 27, since Length Extension=1, the length of the WUR frame/content is variable and the WUR frame content includes the length information. The WUR mode STA may be aware of the length of the WUR frame/content through the length information.

The length information may support various length units (e.g., N bits, N bytes, N symbols, etc.) and include information needed to calculate length.

The Length Extension field may be present in other fields. For example, Table 8 lists an example in which the Length Extension field is included in the Frame Type field.

TABLE 8

| Frame Type | Information |
|---|---|
| 0 | WUR Beacon, without Length Information (i.e., fixed size) |
| 1 | WUR Beacon, with Length Information (i.e., variable size) |
| 2 | Wake-up frame, without Length Information (i.e., fixed size) |
| 3 | Wake-up frame, with Length Information (i.e., variable size) |
| 4 | Discovery frame, without Length Information (i.e., fixed size) |
| 5 | Discovery frame, with Length Information (i.e., variable size) |
| ... | ... |

FIG. 28 illustrates a WUR frame according to another embodiment of the present invention.

The Length Extension field may also be included in a WUR preamble part (e.g., WUR SIG, information sequence, etc.).

Referring to (a) of FIG. 28, since a length extension indicator of a WUR preamble is set to 0, WUR frame content has a fixed length and the length information is not included in the WUR frame content.

Referring to (b) of FIG. 28, since the length extension indicator of the WUR preamble is set to 1, the WUR frame content has a variable size and the length information is included in the WUR frame content.

Example 3

As mentioned above, the WUR frame may have a variable size. STAs may receive or may not receive a WUR frame of a variable size according to capabilities thereof.

When the WUR frame has a variable size, if a WUR preamble/synchronization part (e.g., including SIG) does not indicate length information, an STA may not be aware of how long the STA should perform physical layer (PHY) processing. As described above, STAs in a legacy WLAN (e.g., PCR) could be aware of the length of a PPDU using the Length field included in an L-SIG. However, since a WUR STA fails to decode the L-SIG attached in front of the WUR frame, the WUR STA may not be aware of the length of the PPDU/PSDU.

Hereinafter, a method of receiving a WUR PPDU by a WUR STA when the WUR preamble does not contain the length information will be described.

If an STA having capability of receiving the WUR frame of a variable size starts to receive the WUR frame by detecting the WUR PPDU, the STA may perform a procedure of receiving the WUR frame during a maximum WUR frame length (or maximum PPDU/PSDU length). For example, the STA may transmit PHY-RXSTART.Indication to a MAC layer from a PHY and then perform a reception operation corresponding to a predefined maximum WUR frame length. If reception is ended, the STA may transmit RHY-RXEND. Indication to the MAC layer.

The above-mentioned maximum WUR frame length may be referred to by other terms. For example, the WUR frame length may be replaced with a maximum WUR frame reception (RX) length, a maximum WUR frame transmission (TX) length, a maximum WUR PPDU RX length, a maximum WUR PPDU TX length, a maximum WUR PSDU RX length, a maximum WUR PSDU TX length, or a maximum WUR frame/PPDU/PSDU TX/RX length.

If the WRU frame is received, a PHY of a WURx of the STA performs a WUR PHY reception procedure corresponding to a maximum length based on the length information determined in a system (transmitted by an AP). Hereinafter, for convenience, "a maximum WUR frame length" will be used for description.

For example, the maximum WUR frame length may be determined as follows.

Example 3-1

One fixed maximum WUR frame length in the system may be determined and used. For example, if one of 1 ms, 2 ms, 3 ms, 4 ms, and 5 ms in the system is determined to be the maximum WUR frame length and an STA having a variable size frame reception capability starts to receive the WUR frame (e.g., PHY-RXSTART.Indication), the STA may perform as reception operations corresponding to the determined maximum WUR frame length value.

Example 3-2

The AP may transmit a PCR frame (e.g., a WUR ACK response, a WUR mode signaling response, a WUR negotiation response, ACK, or block ACK, etc.) to the STA through a WUR negotiation procedure or a WUR mode signaling procedure performed on a PCR. During transmission of the PCR frame, the AP may include, in the PCR frame, maximum WUR frame length information which should be assumed by an STA having a variable-size WUR frame reception capability during reception of the WUR frame. For example, the AP may select one of 1 ms, 2 ms, 3 ms, 4 ms, and 5 ms and inform the STA of the selected size. The STA performs a WUR frame reception process using information received from the AP.

Example 3-3

The STA may transmit the PCR frame (e.g., a WUR ACK request, a WUR mode signaling request, or a WUR negotiation request) to the AP through the WUR negotiation procedure or the WUR signaling procedure performed on the PCR. During transmission of the PCR frame, the STA may inform the AP of the maximum WUR frame length information supported thereby in the PCR frame. For example, the STA may select one of 1 ms, 2 ms, 3 ms, 4 ms, and 5 ms and inform the AP of the selected size. The AP may transmit the WRU frame which is not larger than the maximum WUR frame length to the STA, using the maximum WUR frame length information received from the STA.

Example 3-4

Similarly to Example 3-3, the STA may inform the AP of the maximum WUR frame length information through the WUR negotiation procedure or the WUR mode signaling procedure performed on the PCR. The AP may finally determine the maximum WUR frame length to be actually used based on the maximum WUR frame length information received from the STA. For example, the AP may not always conform to the maximum WUR frame length information transmitted by the STA and may determine the maximum WUR frame to be another value when necessary. However, if the AP configures the maximum WUR frame length as another value, the value is set not to be larger than the maximum WUR frame length received from the STA. The AP may include the finally determined maximum WUR frame length in the PCR frame (e.g., a WUR ACK request, a WUR mode signaling request, or a WUR negotiation request) transmitted to the STA.

The above-mentioned WUR negotiation or WUR mode signaling procedure performed on the PCR is exemplary and the maximum WUR frame length information may also be transmitted using other PCR procedures (e.g., association request/response procedure or new frame request/response exchange).

The AP may generate the variable-size WUR frame to be transmitted to the STA based on the determined maximum WUR frame length. That is, the AP generates a frame which is not longer than the determined maximum WUR frame length.

When the AP transmits the WUR frame, the AP may include length information in the MAC header of the WUR frame. As an example, the length information included in the MAC header may be configured as shown in Table 9 or Table 10.

TABLE 9

| Frame Body Length (2 bits) | Information |
|---|---|
| 0 | No frame body |
| 1 | 2 bytes |
| 2 | 4 bytes |
| 3 | More than 4 bytes Extended frame length field is present at a part (the first part) of the Frame Body or TD (Type Dependent) Control field |

TABLE 10

| Frame Body Length (3 bits) | Information |
|---|---|
| 0 | No frame body |
| 1 | 1 byte |
| 2 | 2 bytes |
| 3 | 3 bytes |
| 4 | 4 bytes |
| 5 | 6 bytes |
| 6 | 8 bytes |
| 7 | More than 8 bytes Extended frame length field is present at a part (the first part) of the Frame Body or TD control field |

The present invention is not limited to Table 9 and/or Table 10 and a Frame Body Length field may also be set to a size (e.g., 4 to 8 bits) larger than 3 bits.

Among values of the Frame Body Length field, a specific value (e.g., 3 of Table 9 or 7 of Table 10) indicates that extended frame body length information is located after the Frame Body Length field in the WUR frame. The extended frame body length information may be included in the first part of the Frame Body field or may be included in a TD Control field. For convenience of description, it is assumed that the extended frame body length information is included in the first part of the Frame Body field.

If the Extended Frame Body Length field is included in the Frame Body field, the STA calculates a frame body length using the extended frame body length field information. Next, the STA may determine the location of an FCS field using the frame body length and confirm whether the WUR frame is correctly received through the FCS field.

Upon acquiring the frame body length information or the Extended Frame Body Length field, the STA may stop PHY processing using the length information. For example, if the above-mentioned maximum WUR frame RX length is defined as 3 ms and the frame body length acquired by the (Extended) Frame Body Length field is 1 ms, the STA may perform PHY reception processing only up to the frame body length and stop reception processing before 3 ms.

An STA that does not support variable frame reception performs reception operations corresponding to a frame length of a fixed size. If the STA that does not support variable frame reception detects a variable WUR frame, the STA may immediately stop PHY reception processing. For example, if the STA is aware that the WUR frame is a variable WUR frame (e.g., if the Frame Type field indicates the variable WUR frame or the frame body length information has a value larger than 0), the STA that does not support variable WUR frame reception may stop an MAC/PHY reception operation.

Figure 29:
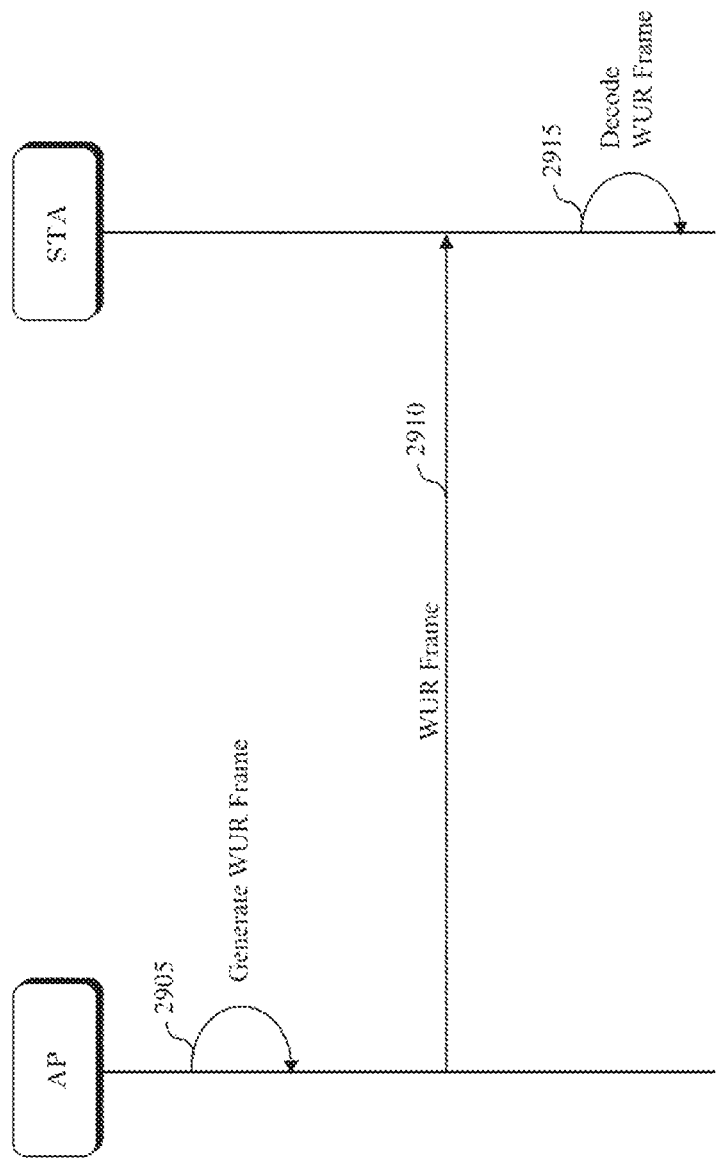
FIG. 29 illustrates a flow of a WUR frame transmission method according to an embodiment of the present invention.

FIG. 29 illustrates a flow of a WUR frame transmission method according to an embodiment of the present invention. A repetitive description given above may be omitted.

Referring to FIG. 29, an AP generates a WUR frame including a WUR preamble and a MAC header (2905).

The AP transmits the WUR frame to at least one STA (2910). For convenience of description, although it is assumed that one STA receives the WUR frame, the present invention is not limited to a unicast WUR frame and the WUR frame may be a multicast/broadcast WUR frame.

The STA decodes the WUR frame (2915).

If frame length information is included in the MAC header, the frame length information may indicate the length of MAC content located after a MAC preamble in the WUR frame. In this case, the length of the MAC header may be excluded from the indicated length of the MAC content.

The length of the MAC content indicated by the frame length information may include a frame body length of the WUR frame.

If the WUR frame has a predefined fixed length, the frame length information may be omitted from the MAC header. For example, only when the WUR frame has a variable length, the frame length information may be included in the MAC header. Whether the WUR frame corresponds to a predefined fixed length or a variable length may be indicated through the MAC header.

If the frame length information is included in the MAC header, the frame length information may indicate the length of the MAC content in units of predetermined bytes.

The WUR preamble may include a sequence for time synchronization for the WUR frame. A transmitter ID may correspond to the AP and a receiver ID may correspond to at least one STA for receiving the WUR frame.

The above description has been given under the assumption that the WUR preamble is a sequence for providing synchronization for the WUR frame (i.e., WUR PPDU) in a WUR part. However, the present invention is not limited by the name of the sequence and the WUR preamble of the WUR part may also be referred to as a WUR synchronization field. WUR content of the WUR part may also be referred to as a WUR data field. In addition, a PCR part may also be referred to as a non-WUR part.

If the term WUR preamble is defined in a wider meaning, the WUR preamble of a wider meaning may be the concept including a WUR synchronization field (i.e., a WUR preamble of a narrow meaning) of the WUR part and including a non-WUR part.

For the WUR packet, a plurality of data rates may be supported. For example, data rates of 62.5 kbps and 250 kbps may be supported by the WUR packet. An actually used data rate may be indicated by a synchronization sequence of the WUR synchronization field. For example, when a first synchronization sequence is used, the data rate of 62.5 kbps may be used and, when a second synchronization sequence is used, the data rate of 250 kbps may be used. Thus, a plurality of WUR synchronization sequences may be supported.

Figure 30:
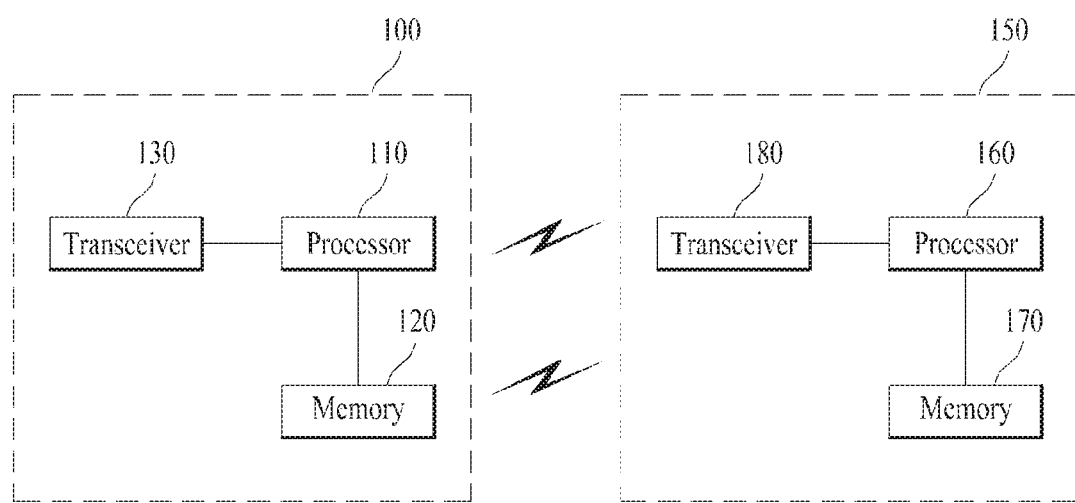
FIG. 30 is an explanatory diagram of an apparatus according to an embodiment of the present invention.

FIG. 30 is an explanatory diagram of an apparatus for implementing the above-described method.

A wireless apparatus 100 of FIG. 30 may correspond to the above-described specific STA and a wireless apparatus 850 of FIG. 30 may correspond to the above-described AP.

The STA 100 may include a processor 110, a memory 120, and a transceiver 130 and the AP 150 may include a processor 160, a memory 170, and a transceiver 180. The transceivers 130 and 180 may transmit/receive a wireless signal and may be implemented in a physical layer of IEEE 802.11/3GPP. The processors 110 and 160 are implemented in a physical layer and/or a MAC layer and are connected to the transceivers 130 and 180. The processors 110 and 160 may perform the above-mentioned UL MU scheduling procedure.

The processors 110 and 160 and/or the transceivers 130 and 180 may include an Application-Specific Integrated Circuit (ASIC), a chipset, a logical circuit, and/or a data processor. The memories 120 and 170 may include a Read-Only Memory (ROM), a Random Access Memory (RAM), a flash memory, a memory card, a storage medium, and/or a storage unit. If an embodiment is performed by software, the above-described method may be executed in the form of a module (e.g., a process or a function) performing the above-described function. The module may be stored in the memories 120 and 170 and executed by the processors 110 and 160. The memories 120 and 170 may be located at the interior or exterior of the processors 110 and 160 and may be connected to the processors 110 and 160 via known means.

The transceiver 130 of the STA may include a transmitter (not shown) and a receiver (not shown). The receiver of the STA may include a primary connectivity receiver for receiving a PCR (e.g., WLAN such as IEEE 802.11 a/b/g/n/ac/ax) signal and a WUR receiver for receiving a WUR signal. The transmitter of the STA may include a PCR transmitter for transmitting a PCR signal.

The transceiver 180 of the AP may include a transmitter (not shown) and a receiver (not shown). The transmitter of the AP may correspond to an OFDM transmitter. The AP may transmit a WUR payload by an OOK scheme by reusing an OFDM transmitter. For example, the AP may modulate the WUR payload by an OOK scheme through an OFDM transmitter as described above.

The detailed description of the exemplary embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention may be applied to various wireless communication systems including an IEEE 802.11 system.

The invention claimed is:

1. A method of transmitting a Wake-Up Radio (WUR) frame by an Access Point (AP) in a Wireless Local Area Network (WLAN) system, the method comprising:
    determining a variability of a length of the WUR frame;
    based on the variability of the length of the WUR frame, generating a WUR frame including a WUR preamble and a Media Access Control (MAC) content,
    wherein the MAC content includes a MAC header, a frame body and a frame check sequence (FCS), and
    wherein the MAC content is located after the WUR preamble in a time domain; and
    transmitting the WUR frame,
    wherein the WUR preamble includes information for a length index,
    wherein based on the length of the WUR frame being variable, the length index indicates a specific value,
    wherein based on the length of the WUR frame being not variable, the length index indicates one of fixed lengths of the WUR frame based on a type of the WUR frame,
    wherein the MAC header includes at least one of a transmitter identifier (ID), or a receiver ID,
    wherein based on the length index indicating the specific value, the MAC header further includes information for the length of the WUR frame, and
    wherein based on the information for the length of the WUR frame being included in the MAC header, the information for the length of the WUR frame indicates a length of the MAC content.

2. The method of claim 1, wherein based on the information of the length of the WUR frame being included in the MAC header, the information of the length of the WUR frame indicates the length of the MAC content in units of predetermined bytes.

3. The method of claim 1, wherein the WUR preamble includes a sequence for time synchronization for the WUR frame, the transmitter ID corresponds to the AP, and the receiver ID corresponds to at least one station (STA) for receiving the WUR frame.

4. The method of claim 1, wherein the type of the WUR frame is one of a WUR beacon, a unicast WUP, a broadcast WUP or a multi-user WUP.

5. The method of claim 1,
    wherein the WUR preamble includes a WUR sequence and a WUR SIG, and
    wherein based on the information for the length of the WUR frame being included in the WUR preamble, the information for the length of the WUR frame is included in the WUR SIG.

6. The method of claim 1,
    wherein, based on the information for the length of the WUR frame being included in the WUR preamble, the WUR preamble includes a plurality of information sequence, and
    wherein each of the plurality of the information sequence relates to the information for the length of the WUR frame.

7. A method of receiving a Wake-Up Radio (WUR) frame by a station (STA) in a Wireless Local Area Network (WLAN) system, the method comprising:
    receiving a WUR frame including a WUR preamble and a Media Access Control (MAC) content,
    wherein the WUR frame is generated based on a variability of a length of the WUR frame determined by an Access Point (AP),
    wherein the MAC content includes a MAC header, a frame body and a frame check sequence (FCS), and
    wherein the MAC content is located after the WUR preamble in a time domain, and
    decoding the WUR frame,
    wherein the WUR preamble includes information for a length index,
    wherein based on the length of the WUR frame being variable, the length index indicates a specific value,
    wherein based on the length of the WUR frame being not variable, the length index indicates one of fixed lengths of the WUR frame based on a type of the WUR frame,
    wherein the MAC header includes at least one of a transmitter identifier (ID), or a receiver ID,
    wherein based on the length index indicating the specific value, the MAC header further includes information for the length of the WUR frame, and
    wherein based on the information for the length of the WUR frame being included in the MAC header, the information for the length of the WUR frame indicates a length of the MAC content.

8. The method of claim 7, wherein based on the information of the length of the WUR frame being included in the MAC header, the information of the length of the WUR frame indicates the length of the MAC content in units of predetermined bytes.

9. An Access Point (AP) for transmitting a Wake-Up Radio (WUR) frame in a Wireless Local Area Network (WLAN) system, the AP comprising:
    a processor configured to:
        determine a variability of a length of the WUR frame,
        based on the variability of the length of the WUR frame, generate a WUR frame including a WUR preamble and a Media Access Control (MAC) content,
        wherein the MAC content includes a MAC header, a frame body and a frame check sequence (FCS), and
        wherein the MAC content is located after the WUR preamble in a time domain; and
    a transmitter configured to transmit the WUR frame,
    wherein the WUR preamble includes information for a length index,
    wherein based on the length of the WUR frame being variable, the length index indicates a specific value,
    wherein based on the length of the WUR frame being not variable, the length index indicates one of fixed lengths of the WUR frame based on a type of the WUR frame,
    wherein the MAC header includes at least one of a transmitter identifier (ID), or a receiver ID,
    wherein based on the length index indicating the specific value, the MAC header further includes information for the length of the WUR frame, and wherein based on the information for the length of the WUR frame being included in the MAC header, the information for the length of the WUR frame indicates a length of the MAC content.

10. A station (STA) for receiving a Wake-Up Radio (WUR) frame in a Wireless Local Area Network (WLAN) system, the STA comprising:
 a receiver configured to receive a WUR frame including a WUR preamble and a Media Access Control (MAC) content,
 wherein the WUR frame is generated based on a variability of a length of the WUR frame determined by an Access Point (AP),
 wherein the MAC content includes a MAC header, a frame body and a frame check sequence (FCS), and
 wherein the MAC header is located after the WUR preamble in a time domain, and
 a processor configured to decode the WUR frame,
 wherein the WUR preamble includes information for a length index,
 wherein based on the length of the WUR frame being variable, the length index indicates a specific value,
 wherein based on the length of the WUR frame being not variable, the length index indicates one of fixed lengths of the WUR frame based on a type of the WUR frame,
 wherein the MAC header includes at least one of a transmitter identifier (ID), or a receiver ID,
 wherein based on the length index indicating the specific value, the MAC header further includes information for the length of the WUR frame, and
 wherein based on the information for the length of the WUR frame being included in the MAC header, the information for the length of the WUR frame indicates a length of the MAC content.

* * * * *